United States Patent
Woo et al.

(10) Patent No.: US 9,802,488 B2
(45) Date of Patent: Oct. 31, 2017

(54) BOARD AND VEHICLE HAVING THE SAME

(71) Applicant: Hyundai Motor Company, Seoul (KR)

(72) Inventors: Seunghyun Woo, Seoul (KR); Daeyun An, Gyeonggi-do (KR); Jongmin Oh, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/955,149

(22) Filed: Dec. 1, 2015

(65) Prior Publication Data

US 2017/0080802 A1 Mar. 23, 2017

(30) Foreign Application Priority Data

Sep. 22, 2015 (KR) .................. 10-2015-0133931

(51) Int. Cl.
*B60K 37/06* (2006.01)
*B60R 11/00* (2006.01)
*B60K 37/04* (2006.01)

(52) U.S. Cl.
CPC .............. *B60K 37/06* (2013.01); *B60K 37/04* (2013.01); *B60R 11/00* (2013.01); *B60K 2350/1024* (2013.01); *B60K 2350/40* (2013.01); *B60K 2350/941* (2013.01); *B60R 2011/0005* (2013.01); *B60R 2011/0092* (2013.01); *B60Y 2200/143* (2013.01)

(58) Field of Classification Search
CPC ..... B60R 2011/0005; B60R 2011/0092; B60R 11/00; B60K 37/06; B60K 2350/1024

USPC ........................................ 296/70
See application file for complete search history.

(56) References Cited

U.S. PATENT DOCUMENTS

| 5,179,590 A * | 1/1993 | Wang .................. B60R 11/0241 224/482 |
| 5,996,866 A * | 12/1999 | Susko ................. B60R 11/0241 224/281 |
| 6,347,987 B1 * | 2/2002 | Ichishi ................... B60H 1/247 454/153 |
| 8,233,269 B2 * | 7/2012 | Hotary ................... B60K 35/00 248/27.1 |
| 9,403,489 B2 * | 8/2016 | Angeletti ............ B60R 11/0241 |
| 2011/0305350 A1 * | 12/2011 | Snider .................... H04B 1/082 381/86 |

FOREIGN PATENT DOCUMENTS

| JP | 2010-254165 A | 11/2010 |
| KR | 10-2005-0053420 A | 6/2005 |
| KR | 100944880 B1 | 3/2010 |

(Continued)

*Primary Examiner* — Pinel E Romain
(74) *Attorney, Agent, or Firm* — Mintz Levin Cohn Ferris Glovsky and Popeo, P.C.; Peter F. Corless

(57) ABSTRACT

A board for a vehicle includes: a base, a plurality of operation units that are provided in the base, perform predetermined functions, and generate signals when they are pressed, a guard unit that is provided in the base and has a plurality of guards that are provided at outer peripheries of the plurality of operation units and formed to be vertically movable, and a movement unit that vertically moves the plurality of guards, is normally used as a general board, and is used as a board having a storage space when there is an object required to be stored, and therefore it is possible to improve user convenience and prevent failure of the object.

23 Claims, 28 Drawing Sheets

(56) References Cited

FOREIGN PATENT DOCUMENTS

| KR | 2011-0011965 U | 12/2011 | | |
|---|---|---|---|---|
| KR | 10-1208644 B1 | 12/2012 | | |
| KR | 101292504 B1 | 8/2013 | | |
| WO | WO 2015063421 A1 | * | 5/2015 | ............. B60R 11/02 |

* cited by examiner ( 111: 111a, 111b, 111c, 111d )

(a)

(b)

(a)

(b)

(248 : 248a, 248b, 248c, 248d)

BOARD AND VEHICLE HAVING THE SAME

CROSS-REFERENCE TO RELATED APPLICATION

This application claims the benefit of and priority to Korean Patent Application No. 10-2015-0133931, filed on Sep. 22, 2015 in the Korean Intellectual Property Office, wherein the disclosure of which is incorporated herein by reference.

BACKGROUND

1. Technical Field

Embodiments of the present disclosure relate generally to a vehicle and, more particularly, to a board with a variety of functions and a vehicle having the same.

2. Description of the Related Art

A board is a panel that blocks an external object or forms the appearance of an object. On the surface thereof, an operation unit for receiving operating commands of a device such as keys, buttons, and a switch, or the like may be provided.

Such a board may be provided in a vehicle, a control room of a power plant, a cockpit of an aircraft, and the like. As is generally known, there are multiple varieties of vehicles, including a passenger car, a bus, a truck, a special work vehicle, and the like, depending on the application. For example, the bus can be known as a motor omnibus on which 11 or more people can ride, and may be classified into a bus (on a regular route), a highway bus (for long distance), a tour bus (for sightseeing), and so forth.

Vehicles can include a head unit for controlling an air conditioner, an audio device, a navigation device, a hands-free device, and the like, for the purpose of user convenience. A head unit may further include an operation unit (e.g., keys, jog dials, switches, buttons, etc.) for receiving operating information of these devices and a display unit for displaying the operating information of these devices.

In a case of a large vehicle such as a bus, a plurality of operation units for controlling traveling and operating internal devices (e.g., a door, and the like) other than devices for convenience may be further provided, and the plurality of operation units may be provided in a sideboard arranged around a driver's seat as well as a dashboard. In such a vehicle, the plurality of operation units are provided in the dashboard and the sideboard. Thus, there can be a problem such as a lack of a storage space for storing a driver's belongings.

Accordingly, the driver may put his or her belongings on the sideboard or the dashboard, and in this case, the belongings may fall to the floor due to sudden turns, a bumpy road, and the like. At this time, an accident may occur if the driver attempts to pick up the belongings which fall to the floor while driving. In addition, at least one of the plurality of operation units may be operated by movements of the belongings, and this may cause a malfunction of the corresponding device.

SUMMARY

Therefore, it is an aspect of the present disclosure to provide a board that may protrude to the outside of the vehicle to form a guard when it is operated by a user, and a vehicle having the same. It is another aspect of the present disclosure to provide a board that may protrude to the outside of the vehicle to form a guard when an object is detected, and a vehicle having the same. It is still another aspect of the present disclosure to provide a board that may protrude to the outside of the vehicle to form a guard when an object is detected and change and deactivate the function of an operation unit which is shielded from the outside by the object, and a vehicle having the same.

Additional aspects of the disclosure will be set forth in part in the description which follows and, in part, will be obvious from the description, or may be learned by practice of the disclosure.

In accordance with embodiments of the present disclosure, a board includes: a base; a plurality of operation units that are provided in the base, perform predetermined functions, and generate signals when they are pressed; a guard unit that is provided in the base and has a plurality of guards that are provided in outer peripheries of the plurality of operation units and formed to be vertically movable; and a movement unit that vertically moves the plurality of guards.

The movement unit may include: a first inclined member that is provided in one or more guards of the plurality of guards, a rotating member that is removably coupled to the first inclined member and has a latch portion, an elastic member that is compressed or stretched by the rotating member, a support member that is provided inside the elastic member and supports the rotating member, and a second inclined member that has first and second mounting portions having different heights from each other on which the latch portion of the rotating member having been guided by the first inclined member is mounted.

The movement unit may control the at least one guard to protrude to an outside of the vehicle when force from a user acts on the at least one guard, and may control the at least one guard to be returned to its original position when the force from the user re-acts on the at least one guard.

The movement unit may include: a rod member that vertically moves the one or more guards, and an actuator that applies a moving force to the rod member.

The board may further include: a detection unit that detects a position of an object; and a control unit that controls operations of the movement unit based on the detected position of the object.

The control unit may deactivate functions of one or more operation units among the plurality of operation units based on the detected position of the object.

The control unit may change functions of one or more operation units among the plurality of operation units based on the detected position of the object.

The control unit may control a protrusion of a guard of the plurality of guards positioned closest to the position of the object but not brought into contact with the object.

The control unit may determine the guard positioned closest to the position of the object but not brought into contact with the object, and may control protrusion of a guard corresponding to an edge of the object among guards not brought into contact with the object.

The control unit may determine a operation unit among the plurality of operation units which is shielded from the outside of the vehicle based on the position of the object, and may control to perform only a function of any one of the plurality of operation units when multiple operation units are shielded from the outside of the vehicle.

The control unit may control protrusion of the guard positioned closest to the position of the object when the object is detected by at least two operation units among the plurality of operation units.

The control unit may control to hold signals of two or more operation units when signals of the two or more operation units are generated.

The control unit may control a height of the protruding guard to vary based on an inclination of the base and positions of the plurality of guards.

Furthermore, according to embodiments of the present disclosure, a vehicle includes: a dashboard and a sideboard; a plurality of operation units that are provided in at least one of the dashboard and the sideboard, perform predetermined functions, and generate signals when they are pressed; a guard unit that has a plurality of guards which are provided in outer peripheries of the plurality of operation units and formed to be vertically movable; and a movement unit that vertically moves the plurality of guards.

The movement unit may include: a first inclined member that is provided in one or more guards of the plurality of guards, a rotating member that is removably coupled to the first inclined member and has a latch portion, an elastic member that is compressed or stretched by the rotating member, a support member that is provided inside the elastic member and supports the rotating member, and a second inclined member that has first and second mounting portions having different heights from each other on which the latch portion of the rotating member having been guided by the first inclined member is mounted.

The movement unit may include: a rod member that vertically moves the one or more guards, and an actuator that applies a moving force to the rod member.

The vehicle may further include: a detection unit that detects a position of an object; and a control unit that controls operations of the movement unit based on the detected position of the object.

The control unit may deactivate functions of one or more operation units among the plurality of operation units based on the detected position of the object.

The control unit may change functions of one or more operation units among the plurality of operation units based on the detected position of the object.

The control unit may control a protrusion of a guard of the plurality of guards positioned closest to the position of the object but not brought into contact with the object.

When the control unit may control protrusion of the guard positioned closest to the position of the object when the object is detected by at least two operation units among the plurality of operation units.

The control unit may control a height of the protruding guard to vary based on an inclination of the base and positions of the plurality of guards.

Furthermore, according to embodiments of the present disclosure, a board for a vehicle includes: a base in which a plurality of holes are formed into a lattice shape; a guard unit that has a plurality of guards which are arranged so as to be vertically movable while being respectively arranged inside the plurality of holes; a movement unit that vertically moves the plurality of guards; a detection unit that detects a position of an object; and a control unit that controls one or more guards among the plurality of guards to protrude by controlling the movement unit based on the detected position of the object.

The movement unit may include: a rod member that vertically moves one or more guards, and an actuator that applies a moving force to the rod member.

Furthermore, according to embodiments of the present disclosure, a board for a vehicle including: a base in which a plurality of holes are formed into a lattice shape; a guard unit that has a plurality of guards which are respectively arranged inside the plurality of holes, wherein a guard on which force from a user acts protrudes to an outside of the vehicle; and a movement unit that vertically moves the plurality of guards.

The movement unit may include: a first inclined member that is provided in the protruding guard, a rotating member that is brought into contact with and separated from the first inclined member and has a latch portion, an elastic member that is compressed or stretched by the rotating member, a support member that is provided inside the elastic member and supports the rotating member, and a second inclined member that has a plurality of mounting portions having mutually different heights on which the latch portion of the rotating member having been guided by the first inclined member is mounted.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF THE EMBODIMENTS

Figure 1:
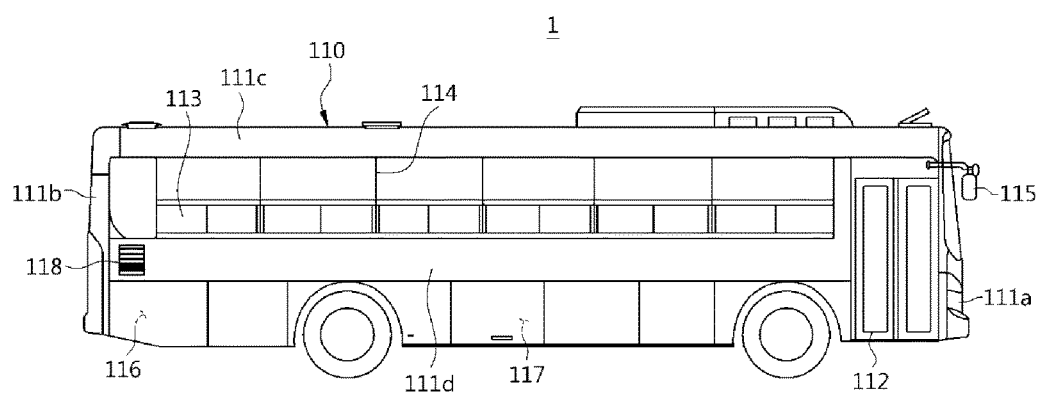
FIG. 1 illustrates the outside of a vehicle having a board in accordance with embodiments of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Hereinafter, the present disclosure will be described in detail with reference to the accompanying drawings.

Figure 2:
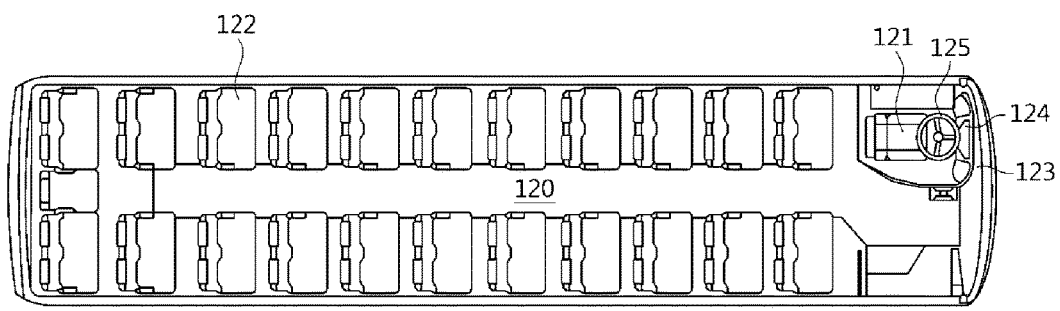
FIG. 2 illustrates the inside of a vehicle having a board in accordance with embodiments of the present disclosure.
Figure 3:
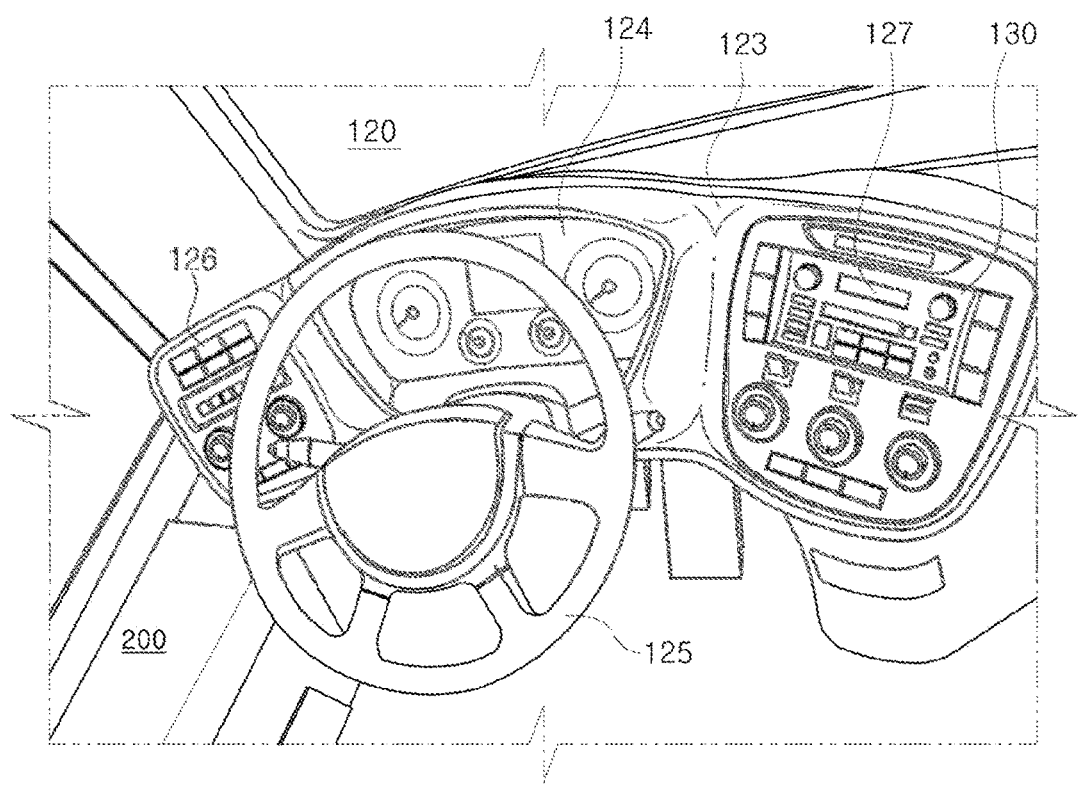
FIG. 3 illustrates a cab in an interior of a vehicle and having a board in accordance with embodiments of the present disclosure.

FIG. 1 illustrates the outside of a vehicle having a board in accordance with embodiments of the present disclosure, FIG. 2 illustrates the inside of a vehicle having a board in accordance with embodiments of the present disclosure, and FIG. 3 illustrates a cab in an interior of a vehicle and having a board in accordance with embodiments of the present disclosure.

The board according to the present embodiment may be a board in which a separate storage compartment is not generally provided such as in a cockpit of an aircraft, a control room of a power plant, a studio sub-control room (i.e., mixing room) of a broadcast station, a bus cab, and the like, or a board in which a plurality of operation units are provided over a wide area.

As an example of the board in accordance with embodiments of the present disclosure, a sideboard provided in a vehicle, that is, a bus, will be provided and described.

A vehicle 1 is a machine that travels by driving wheels of the vehicle in order to transport people or cargo, and may be a bus on which a larger number of people than those in a passenger car can ride. Such a vehicle 1 includes a body having interior and exterior and a chassis in which a mechanism required for traveling is installed as the remaining parts other than the body.

As shown in FIG. 1, the exterior 110 of the body includes a frame that forms a skeleton of the vehicle and supports the weight of the body and a panel 111 that surrounds around the frame. Here, the panel 111 includes a front panel 111a, a rear panel 111b, a roof panel 111c, and side panels 111d.

The exterior of the vehicle includes a door 112 that is arranged between the front panel 111a and the side panel 111d and forms a passage for allowing a user to get on and off. In addition, the door 112 may be further provided in the side panel in the rear side of the vehicle.

The exterior of the vehicle further includes windows 113 which are respectively arranged at the door 112, the front panel 111a, and the side panels 111d, and a pillar 114 that is provided at each of boundaries of the windows 113.

The exterior of the body further includes side mirrors 115 that provide a view of the rear side of the vehicle 1 to a driver.

Below the body of the vehicle, an engine compartment 116 in which an engine is stored and a cargo compartment 117 into which cargo is loaded, the engine compartment 116 and the cargo compartment 117 can be opened and closed by a separate door.

In addition, the vehicle further includes an engine air intake 118 that is formed in the side panel 111d and guides the external air to the engine compartment 116.

In addition, the vehicle further includes a headlight that is provided in the front panel 111a and outputs light toward the road ahead and a tail light that is provided in the rear panel 111b and outputs light toward the road behind.

The chassis of the vehicle further includes a power generation device, a power transmission apparatus, a traveling apparatus, a steering apparatus, a brake apparatus, a suspension apparatus, a gear shift apparatus, a fuel device, front/rear and left/right wheels, and the like.

Such a vehicle 1 includes an electronic control unit (ECU) for controlling the driving of the power generation apparatus, the power transmission apparatus, the traveling apparatus, the steering apparatus, the brake apparatus, the suspension apparatus, the gear shift apparatus, the fuel apparatus, a variety of safety devices, and a variety of sensors. In addition, the vehicle 1 may selectively include electronic devices such as a hands-free device, a GPS, an audio device, a Bluetooth device, a rear camera, a charging device, a high-pass device, a navigation device, and the like for the purpose of driver convenience. The vehicle 1 further includes a battery (not shown) that is electrically connected to an indoor lighting device, a starter motor, and electronic devices and supplies driving power. Such a battery performs charging using the power of a self-generator or an engine while the vehicle is traveling.

As shown in FIG. 2, the interior of the body includes a driver's seat 121 on which a driver is seated, a plurality of passenger seats 122 on which a plurality of passengers other than the driver are seated, a dashboard 123, a cluster (i.e., instrument panel 124) that is arranged on the dashboard 123 to exhibit traveling functions and vehicle information such as a vehicle speed, rpms, oil quantity, coolant amount, and the like, and a steering wheel 125 that manipulates the traveling direction of the vehicle.

More specifically, the plurality of passenger seats 122 may be arranged in a line from both side surfaces inside the vehicle, and arranged in such a manner that a passage is formed in the center inside the vehicle.

As shown in FIG. 3, in the dashboard 123, a head unit 126 in which operation units for controlling an indoor lighting device, an air conditioner, a Bluetooth device, door opening/closing, and the like are arranged may be provided.

In the dashboard 123, a display unit 127 that displays operating information about one or more functions may be further provided. In the dashboard 123, an audio device 130 that outputs sound may be provided. In addition, in the dashboard 123, a navigation device (not shown) may be further provided. Here, the navigation device may be provided in an embedded or holding manner.

The cluster 124 may be implemented digitally. The cluster 124 that is implemented digitally displays vehicle information and traveling information as images.

In addition, the vehicle may further include a sideboard 200 for storage that is provided on the left door side while being provided around the driver's seat and is used for the convenience of the driver (alternatively referred to as a "user"). Such a sideboard 200 may be a panel having a predetermined area, of which a surface is flat.

Hereinafter, the sideboard 200 capable of storage will be described in detail.

Figure 4:
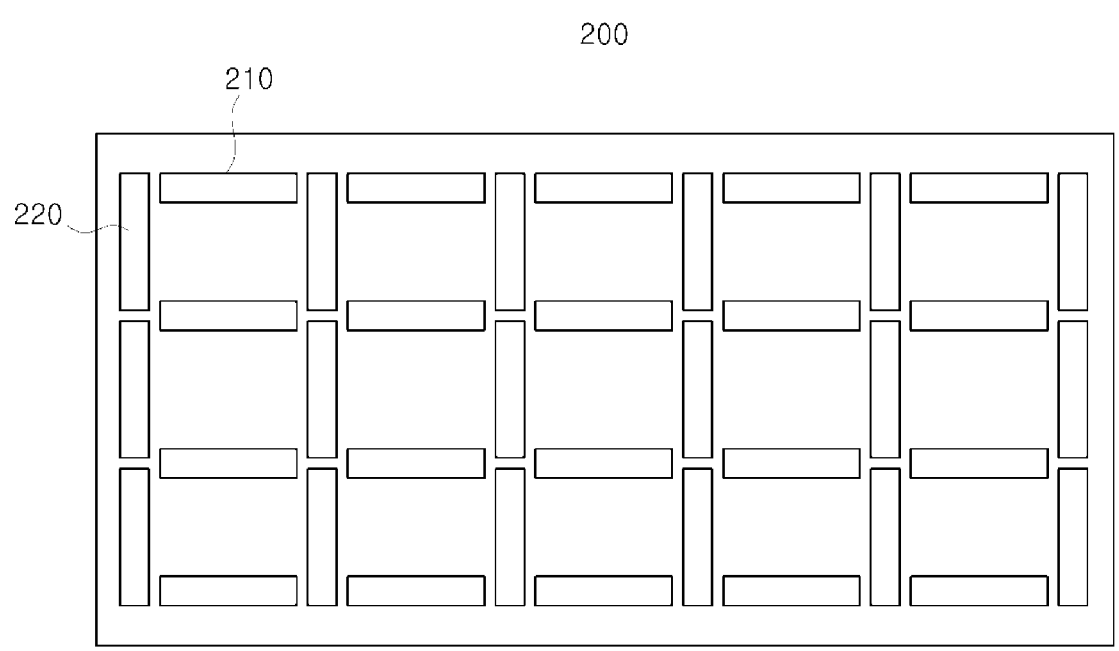
FIG. 4 illustrates a sideboard among boards in accordance with embodiments of the present disclosure.

FIG. 4 is an example of the sideboard 200 in accordance with embodiments of the present disclosure.

The sideboard 200 includes a base 210 that has a plurality of holes formed in a grid pattern, and a guard unit 220 that has a plurality of guards arranged so as to be vertically movable while being respectively arranged inside the plurality of holes of the base 210 and forms a fence when one or more guards protrude upward.

Such a structure in which the guards of the sideboard protrude will be described with reference to FIGS. 5 and 6.

Figure 5:
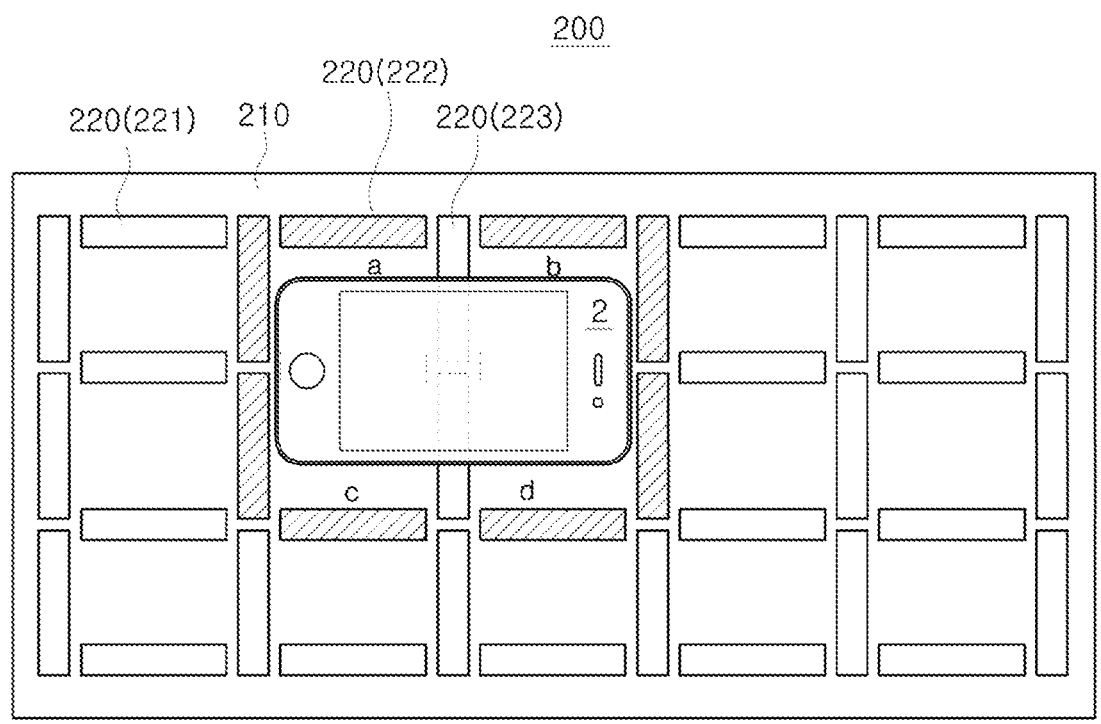
FIG. 5 is a plan view when a guard provided in a sideboard among boards in accordance with embodiments of the present disclosure protrudes.
Figure 6:
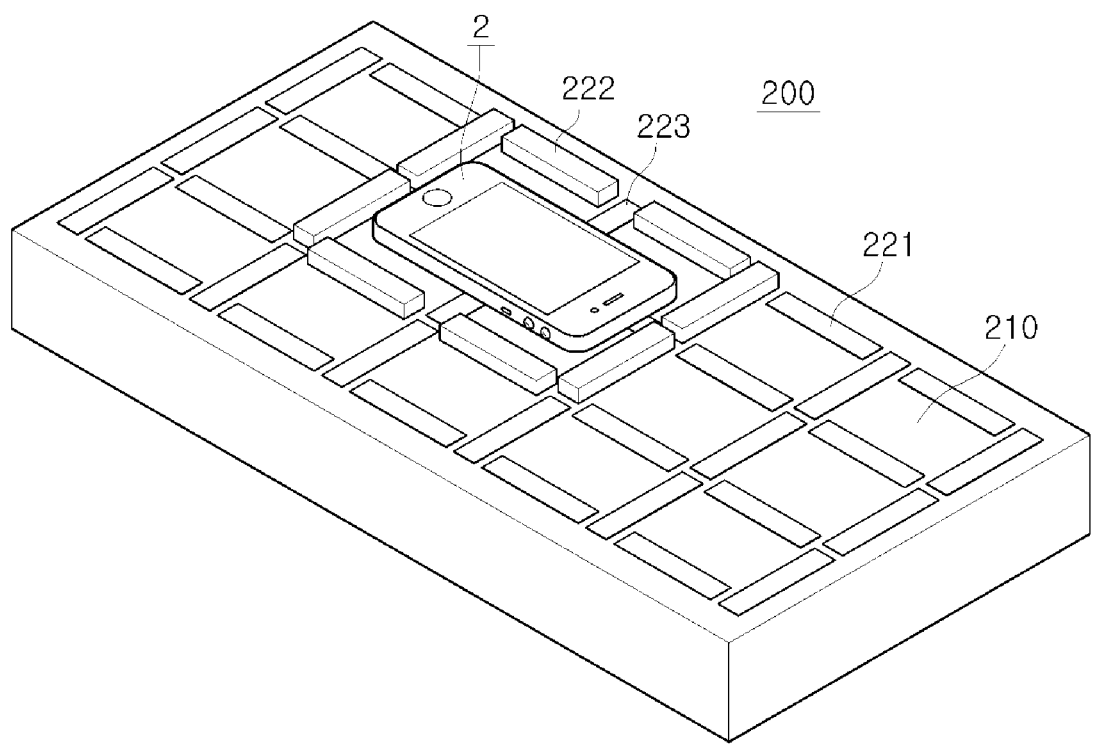
FIG. 6 is a perspective view of the sideboard shown in FIG. 5.

FIG. 5 is a plan view when guards provided in the sideboard protrude in accordance with embodiments of the present disclosure, and FIG. 6 is a perspective view of the sideboard shown in FIG. 5.

As shown in FIGS. 5 and 6, when a terminal 2 that is an external object is placed on the sideboard 200, the sideboard 200 forms a fence having a larger size than that of the terminal 2 in order to prevent the movement of the terminal 2.

Here, the fence may be formed by a plurality of guards. That is, the sideboard 200 forms the fence by protruding upward two or more guards 222 positioned closest to the outer periphery of the terminal 2 among guards 221 and 222 which are not brought into contact with the terminal 2.

In this instance, the guard 223 that is brought into contact with the terminal 2 is kept inserted, so a surface having the same height as that of the surface of the base 210 may be maintained. The two or more guards which protrude may be selected by a user or automatically selected.

A structure of the guards which protrude upward when they are selected by the user or automatically selected will be described with reference to FIGS. 7 and 8.

Figure 7:
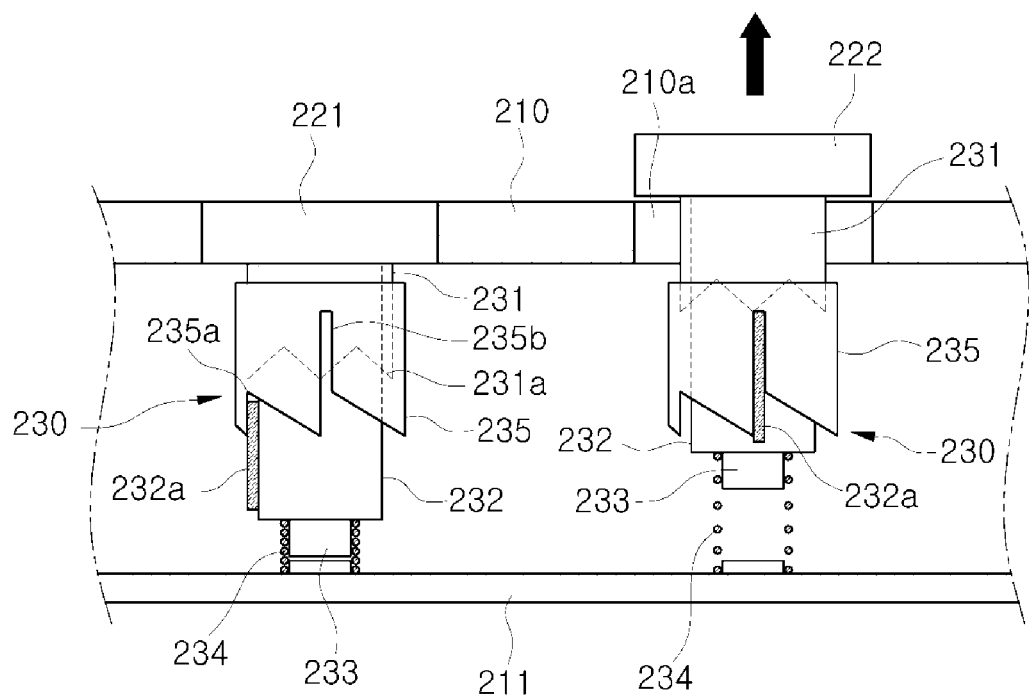
FIG. 7 is a schematic view of a manual guard provided in a board in accordance with embodiments of the present disclosure.

FIG. 7 is a schematic view of a manual guard provided in a sideboard in accordance with embodiments of the present disclosure.

The sideboard 200 includes a guard unit 220 having a plurality of guards 221 and 222, and further includes a movement unit 230 that is provided in each of the plurality of guards of the guard unit and vertically moves each of the guards when a user's force acts on the guards.

The movement unit that is provided in each of the plurality of guards is formed to have the same structure. Among these movement units, one movement unit 230 will be described.

The movement unit 230 includes a first inclined member 231 that is connected to the guard and has a plurality of inclined portions 231a formed into a saw-tooth shape, a rotating member 232 that is removably coupled to the first inclined member 231 and has a latch portion 232a rotatably moved by contact of the inclined portion of the first inclined member 231 with the latch portion 232a, a support member 233 that is installed in an installation frame 221 to support the rotating member 232, an elastic member 234 that is arranged outside the support member 233 and is compressed or stretched by the rotating member 232, and a second inclined member 235 that has a plurality of mounting portions 235a and 235b having mutually different heights on which the latch portion 232a of the rotating member having been guided by the first inclined member 231 is mounted.

The latch portion 232a of the rotating member 232 is separated from or coupled to the first inclined member 231, and is mounted on a first mounting portion or a second mounting portion of the second inclined member 235.

A movement structure of the movement unit 230 will be briefly described. When the latch portion 232a of the rotating member is mounted on the first mounting portion 235a of the second inclined member, the guard 221 has the same height as that of the surface of the base 210. That is, the guard 221 is disposed inside the hole of the base.

Next, when a force acts on the guard 221, the force acting on the guard 221 is applied to the first inclined member 231, and the latch portion 232a mounted on a first mounting portion 235a is rotatably moved by the force applied to the first inclined member 231 while being pushed by the inclined portion 231a. Next, the latch portion 232a of the rotating member is brought into contact with the second inclined member 235 while the first inclined member 231 is separated from the rotating member 232, and at the time, the latch portion 232a of the rotating member is mounted on a second mounting portion 235b while being moved along an inclined surface of the second inclined member 235. In this instance, the guard 222 may protrude to the outside through a hole 210a of the base 210.

Next, when a force acts again on the guard 222 that protrudes to the outside, the force acting on the guard 222 is applied to the first inclined member 231, and the latch portion 232a is brought into contact with the inclined portion 231a of the first inclined member 231 by the force applied to the first inclined member 231, and then the latch portion 232a having been brought into contact with the inclined portion 231a is rotatably moved while being pushed. Next, the latch portion 232a is brought into contact with the inclined surface of the second inclined member 235 while the first inclined member 231 is separated from the rotating member 232, and is mounted on the first mounting portion 235a while being moved along the inclined surface of the second inclined member 235.

In this instance, the guard 221 is moved downward towards the base 210 and then has the same height as that of the surface. That is, the guard 221 is inserted into the hole of the base and disposed inside the hole.

Figure 8:
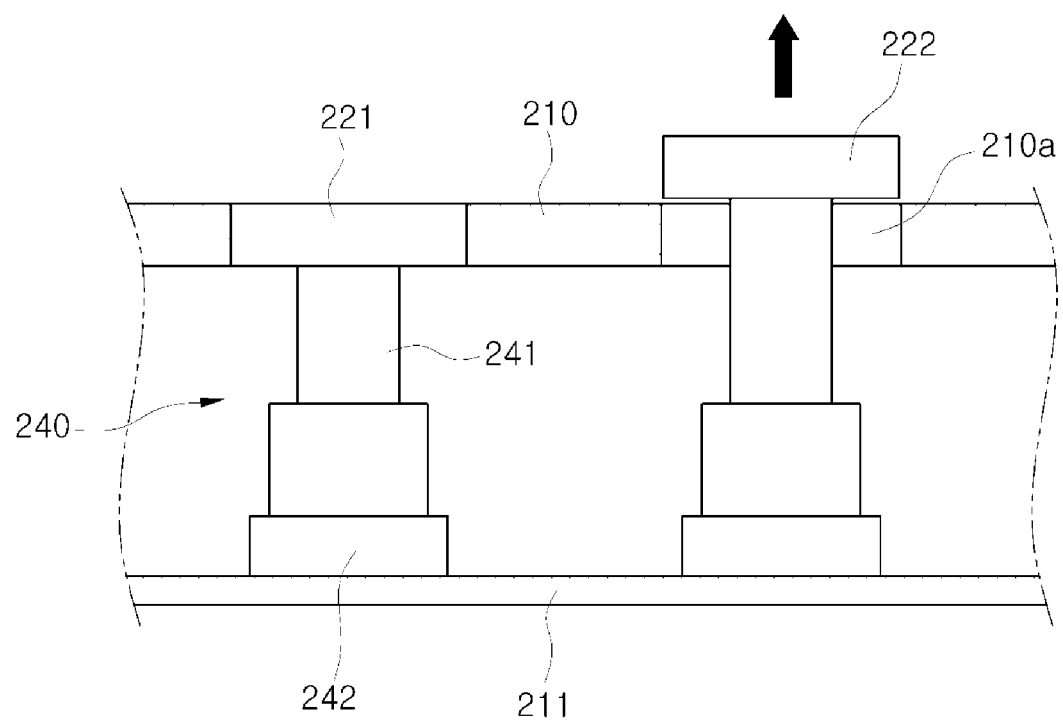
FIG. 8 is a schematic view of an automatic guard provided in a board in accordance with embodiments of the present disclosure.

FIG. 8 is a schematic view of an automatic guard provided in the sideboard 200 in accordance with embodiments of the present disclosure.

The sideboard 200 includes a guard unit 220 having a plurality of guards 221 and 222, and further includes a movement unit 240 that is provided in each of the plurality of guards of the guard unit and automatically moves each of the guards when an object is detected.

The movement unit 240 provided in each of the plurality of guards is formed to have the same structure. Among these movement units, one movement unit 240 will be described. The movement unit 240 includes a rod member 241 that is integrally fixed to the guard 221 and moves vertically by pressure, and an actuator 242 that controls the rod member 241 to be moved by applying a moving force to the rod member 241.

The actuator 242 may further include a cylinder (not shown) that is provided below the rod member 241 and applies pressure to the rod member 241, a compressor (not shown) that generates pressure and applies the generated pressure to the cylinder, and a valve (not shown) that is disposed between the compressor (not shown) and the cylinder and adjusts the transmission of the pressure generated from the compressor (not shown).

The movement unit 240 may further include an elastic member (not shown) that is provided below the rod member 241 while being provided inside the cylinder and applies a restoring force to the rod member 241.

When air pressure in the cylinder is removed, the rod member 241 returns to its original position. In this instance, the guard 221 is positioned inside the hole 210a of the base. When the air pressure is applied into the cylinder, the rod member 241 pushes the guard 222. In this instance, the guard 222 is moved towards the upper side of the base 210 through the hole 210a, so it protrudes from the base 210.

In addition, the automatic guard may be vertically moved by a movement unit implemented in the manner of an electromagnet.

A control structure of the sideboard for controlling such an automatic guard will be described with reference to FIG. 9.

Figure 9:
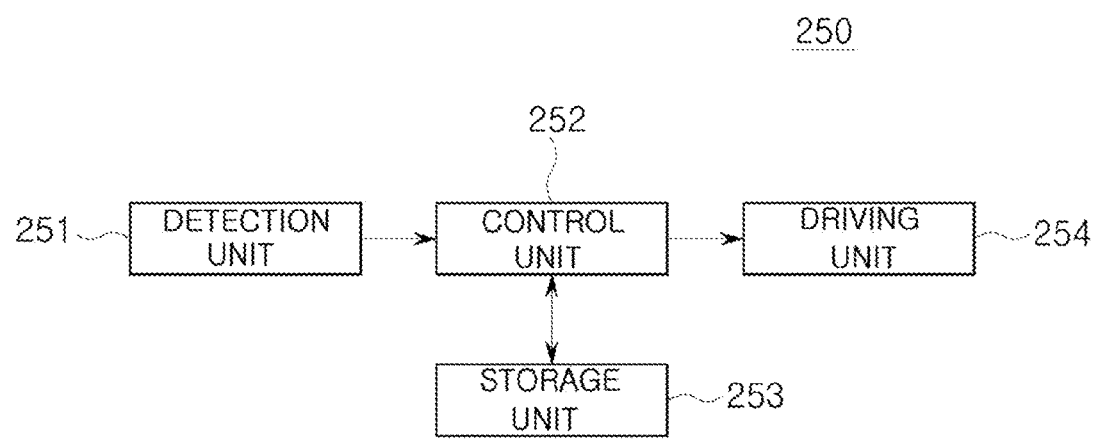
FIG. 9 is a control block diagram of a board in accordance with embodiments of the present disclosure.

FIG. 9 is a control block diagram of a sideboard in accordance with embodiments of the present disclosure, and a driving module 250 for controlling the sideboard includes a detection unit 251, a control unit 252, a storage unit 253, and a driving unit 254.

The detection unit 251 is respectively provided in an empty area in which the guard is not formed while it is provided in the base 210, and outputs a signal when an object is placed on the sideboard. Such a detection unit 251 may include a pressure sensor such as a load cell, a pressure sensor such as a piezo sensor, an ultrasonic sensor, an optical sensor, and a proximity sensor such as a capacitive sensor.

The control unit 252 determines a position on which the object is placed based on the signal transmitted from the detection unit 251, and controls driving of the driving unit 254 when the position of the object is detected for a predetermined time or more. That is, the control unit 252 determines the guard closest to at least four azimuths while determining the guard closest to the object based on the position of the object, and controls the protrusion of the determined guard.

This will be described with reference to FIG. 5.

The control unit 252 determines the position on which the object is placed by processing the signal transmitted from the detection unit 251. When it is determined that a detection signal of the object is received from the detection unit provided in four areas a, b, c, and d, the control unit 252 determines the guards 222 of the four azimuths closest to the four areas a, b, c, and d, and controls the protrusion of the determined guard.

The storage unit 253 stores position information of the empty area of the base and position information of the plurality of guards.

The driving unit 254 transmits a driving signal to the movement unit 240 so that the determined guard is moved vertically. That is, the driving unit 254 may be a circuit that drives the compressor and the valve of the movement unit.

In addition, the detection unit 251 may be provided in each of the plurality of guards.

In this instance, the control unit 252 may determine the position of the guard in which the object is detected, and protrude the guard closest to the determined position.

This will be described with reference to FIG. 5.

The control unit 252 determines the position on which the object is placed by processing the signal transmitted from the detection unit 251. When it is determined that a detection signal of the object is received from the detection unit provided in four guards 223, the control unit 252 determines the guards 222 of the four azimuths closest to the four guards 223, and controls the protrusion of the determined guard 222.

Figure 10:
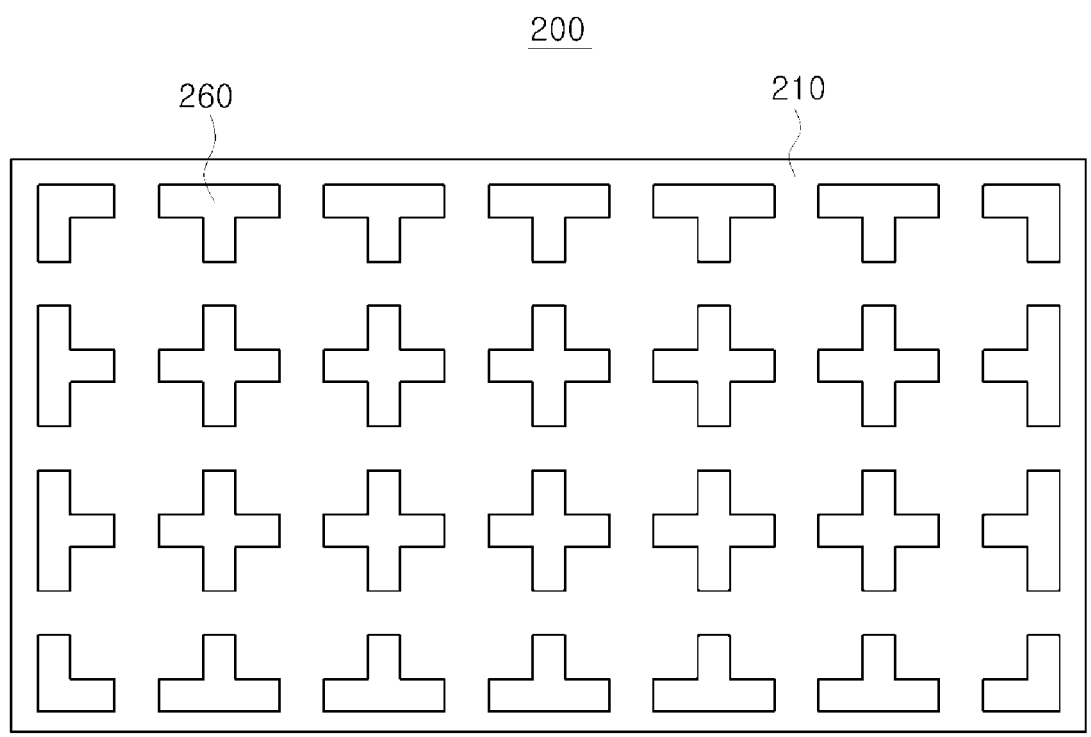
FIG. 10 is another example of a guard unit provided in a board in accordance with embodiments of the present disclosure.
Figure 11:
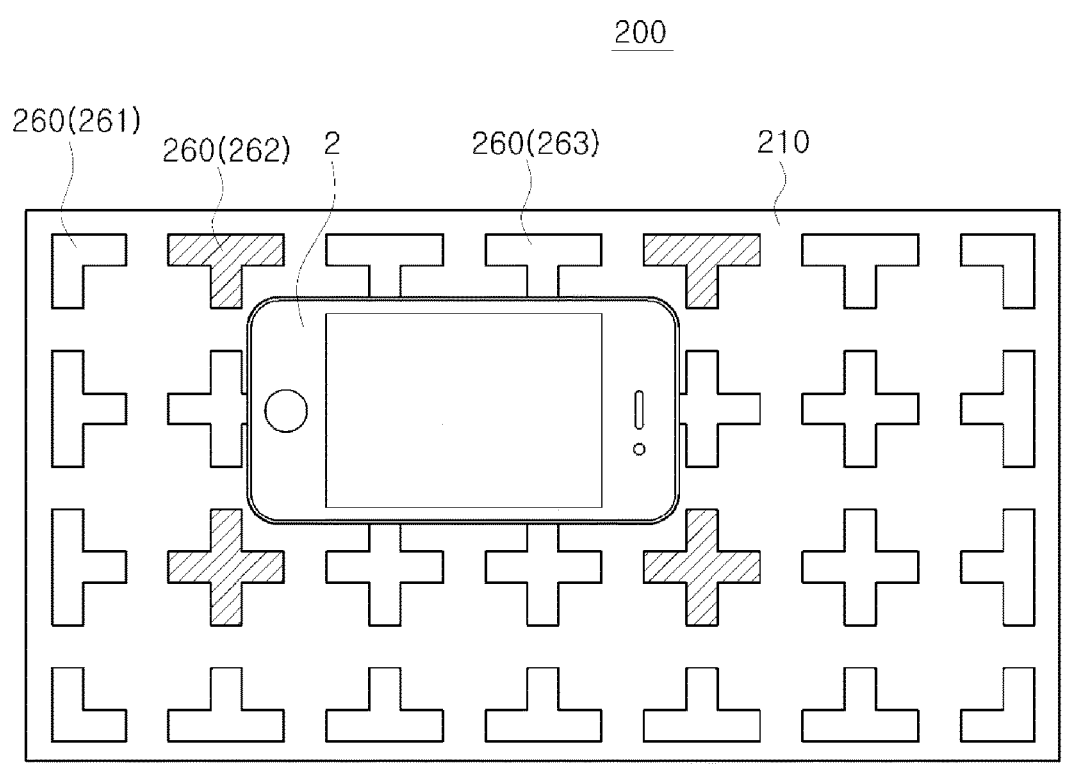
FIG. 11 is a plan view when a guard provided in the board shown in FIG. 10 protrudes.

FIG. 10 is another example of a guard unit provided in a sideboard in accordance with embodiments of the present disclosure, and FIG. 11 is a plan view when a guard provided in the board shown in FIG. 10 protrudes.

As shown in FIG. 10, a plurality of guards 260 provided in the sideboard 200 may be formed into a T-shape, an L-shape, and a plus (+)-shape to conform to shapes of edges of an object, so that movement of the object is minimized. That is, the outer guards may be formed into the T-shape and the L-shape, and the inner guards may be formed into the plus (+)-shape.

As shown in FIG. 11, the sideboard 200 may minimize the protrusion of the guard by protruding only guards adjacent to the edges of an object 2.

More specifically, the sideboard determines the position on which the object is placed by processing the signal transmitted from the detection unit 251. In this instance, when it is determined that the detection signal is received from the detection unit provided in six areas, the sideboard determines guards 262 corresponding to edges of the six areas, and protrudes the determined guards 262.

Figure 12:
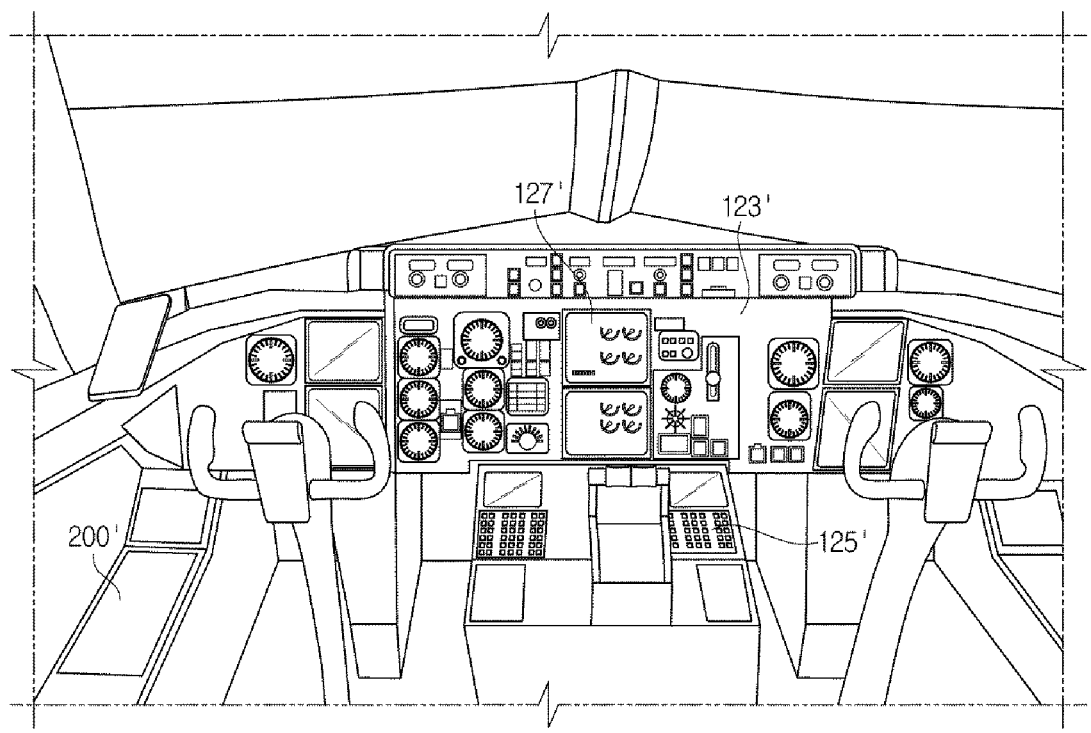
FIG. 12 is an example of the inside of a cockpit of an aircraft having a board in accordance with embodiments of the present disclosure.

FIG. 12 is an example of the inside of a cockpit of an aircraft having a board in accordance with embodiments of the present disclosure.

The cockpit of the aircraft is an area to control operations of the aircraft, and in the cockpit, a phone for contact with cabin crew, a flight management computer (FMC) for assisting taking-off and checklists, a switch for autopilot, a battery switch, an engine start button, switches for displaying an engine output and an error message and supplying jet aircraft fuel to the engine, and the like are arranged.

More specifically, the cockpit of the aircraft may include a display board 123' in which a display unit 127' for displaying a current state of the aircraft and displaying a variety of information such as speed, altitude, orientation, angle, and the like is disposed.

The cockpit of the aircraft may further include a function control board 125' in which operation units for receiving commands for controlling taking-off and landing, a height, direction adjustment, display of the aircraft, and the like are arranged. The operation unit may include keys, buttons, switches, or the like.

The cockpit of the aircraft may further include a sideboard 200' that forms the appearance of a box for storing an oxygen mask and the like.

Figure 13:
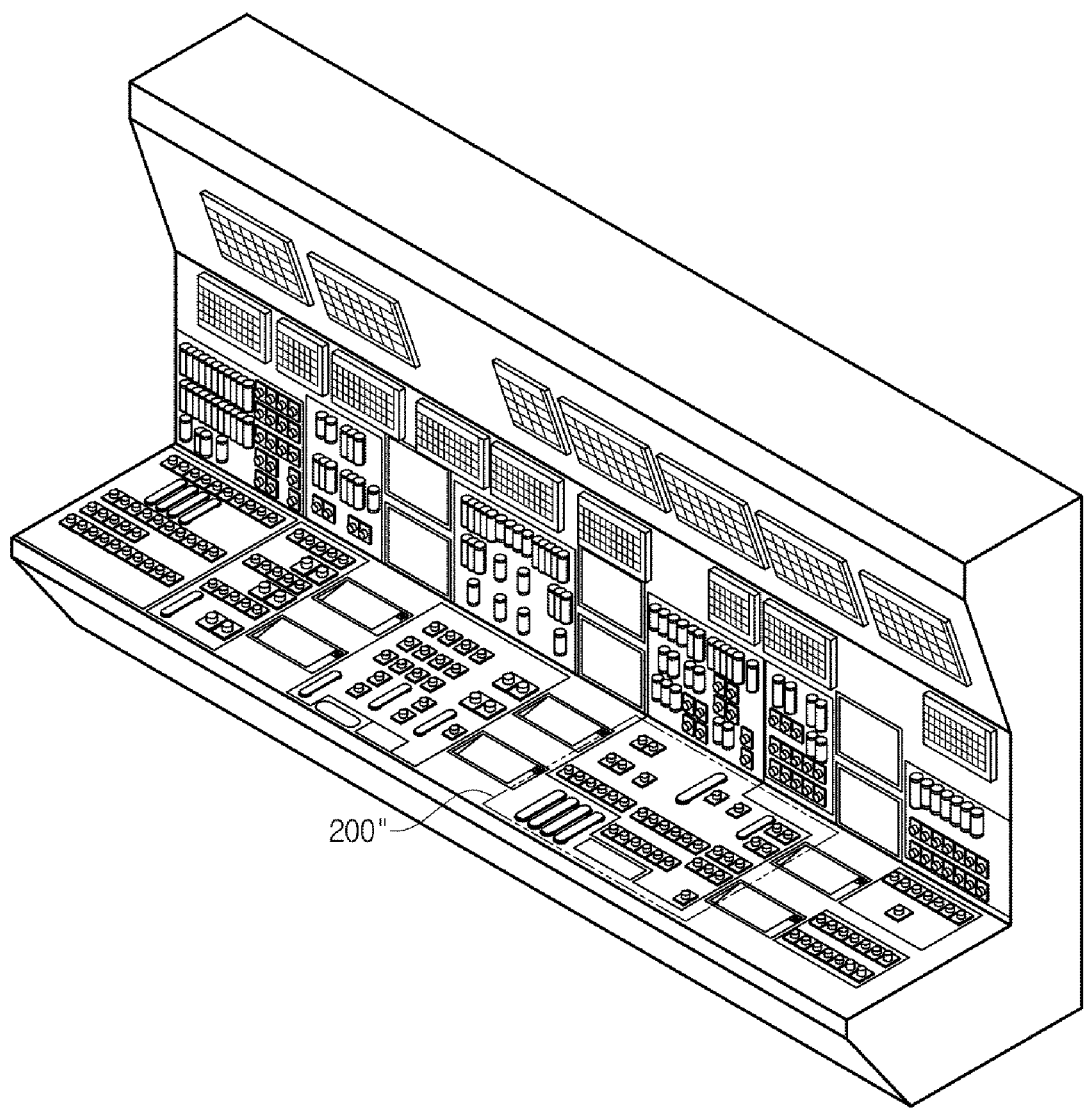
FIG. 13 is an example of the inside of a control room of a power plant having a board in accordance with embodiments of the present disclosure.

FIG. 13 is an example of the inside of a control room of a power plant having a board in accordance with embodiments of the present disclosure.

The power plant may include all plants equipped with facilities which convert a variety of energy sources existing in the nature into electrical energy, such as thermal power plants, nuclear power plants, solar power plants, hydraulic power plants, geothermal power plants, tidal power plants, natural flow stations, wind power plants, etc.

As shown in FIG. 13, in the control room of the power plant, a board 200" in which operation units for receiving operation commands of a variety of facilities associated with generation of electricity such as an amount of generated electricity, an opening/closing command for a floodgate, a monitoring command, and the like are arranged may be provided.

Figure 14:
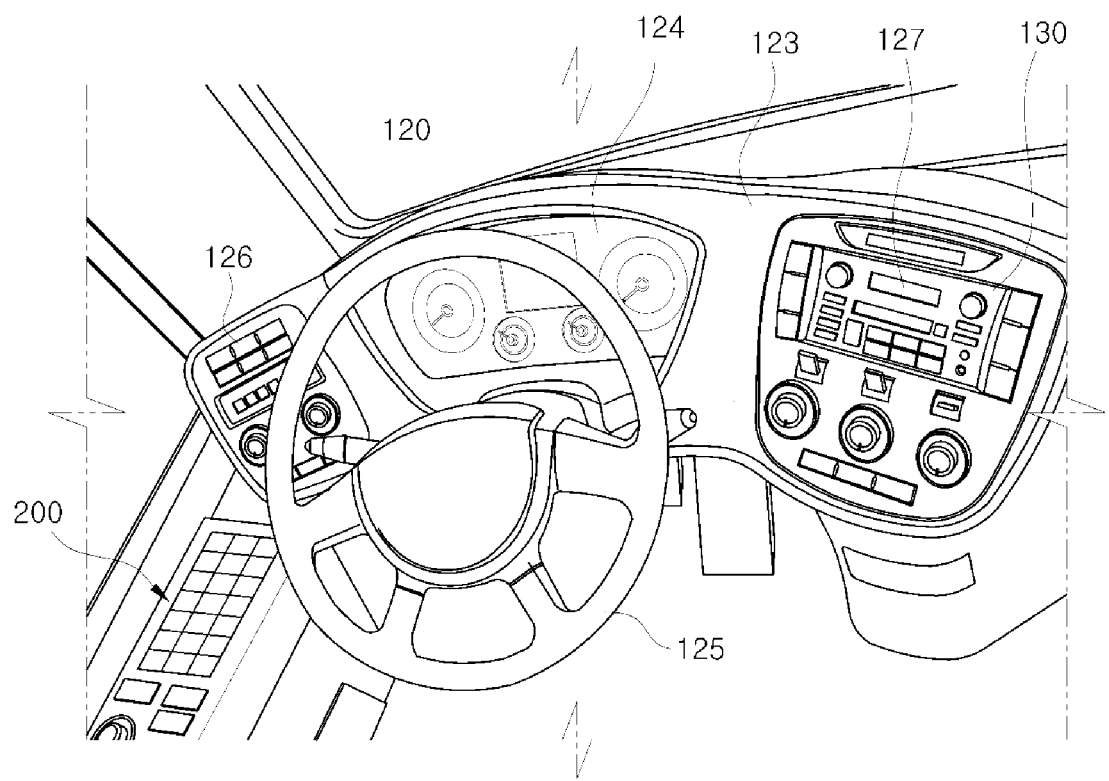
FIG. 14 is an example of a cab in an interior of a vehicle and having a board in accordance with embodiments of the present disclosure.

The operation unit may include keys, buttons, switches, and the like. FIG. 14 is an example of a cab in an interior of a vehicle and having a board in accordance with another embodiment of the present disclosure. As shown in FIG. 14, in the dashboard 123, a head unit 126 in which operation units for controlling an indoor lighting device, an air conditioner, a Bluetooth device, door opening/closing, and the like are arranged is provided.

In the dashboard 123, a display unit 127 for displaying operating information about one or more functions may be further provided. In the dashboard 123, an audio device 130 for outputting sound may be further provided. In addition, in the dashboard 123, a navigation device (not shown) may be further provided. Here, the navigation device may be provided in an embedded or holding manner.

The cluster 124 may be implemented digitally. The cluster 124 that is implemented digitally displays vehicle information and traveling information as images.

In addition, the vehicle may further include a sideboard 200 in which a plurality of operation units for inputting operation commands of one or more functions and devices are arranged.

Such a sideboard 200 may be a panel having a predetermined area, of which a surface is flat.

Hereinafter, the sideboard 200 capable of storage will be described in detail.

Figure 15:
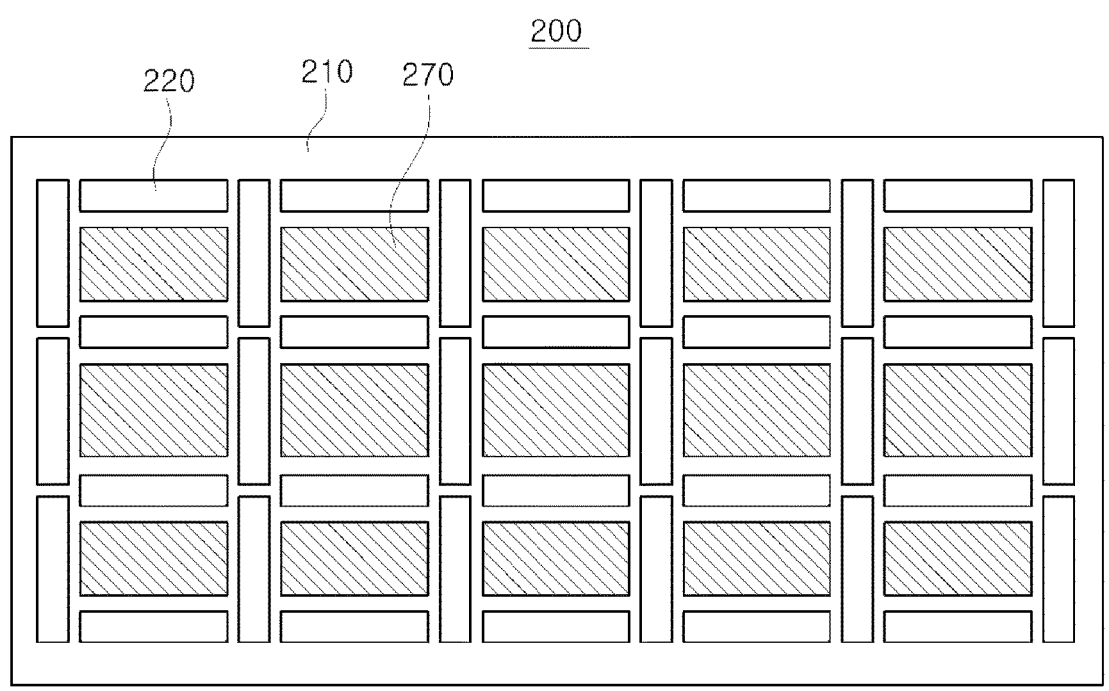
FIG. 15 is an example of a sideboard among boards in accordance with embodiments of the present disclosure.

FIG. 15 is an example of the sideboard 200 in accordance with embodiments of the present disclosure.

The sideboard 200 includes a base 210 that has a plurality of holes formed in a grid pattern, a guard unit 220 that has a plurality of guards arranged so as to be vertically movable while being respectively arranged inside the plurality of holes of the base 210 and forms a fence when one or more guards protrude upward, and a plurality of operation units 270 which are arranged between the plurality of guards while being arranged in the base 210.

Here, the plurality of guards 220 may have the same heights as those of the plurality of operation units 270 and the base 210, or have lower heights than those of the plurality of operation units 270. The plurality of guards 220 become higher than those of the plurality of operation units 270 when they protrude.

Such a structure in which the guards of the sideboard protrude will be described with reference to FIG. 16.

Figure 16:
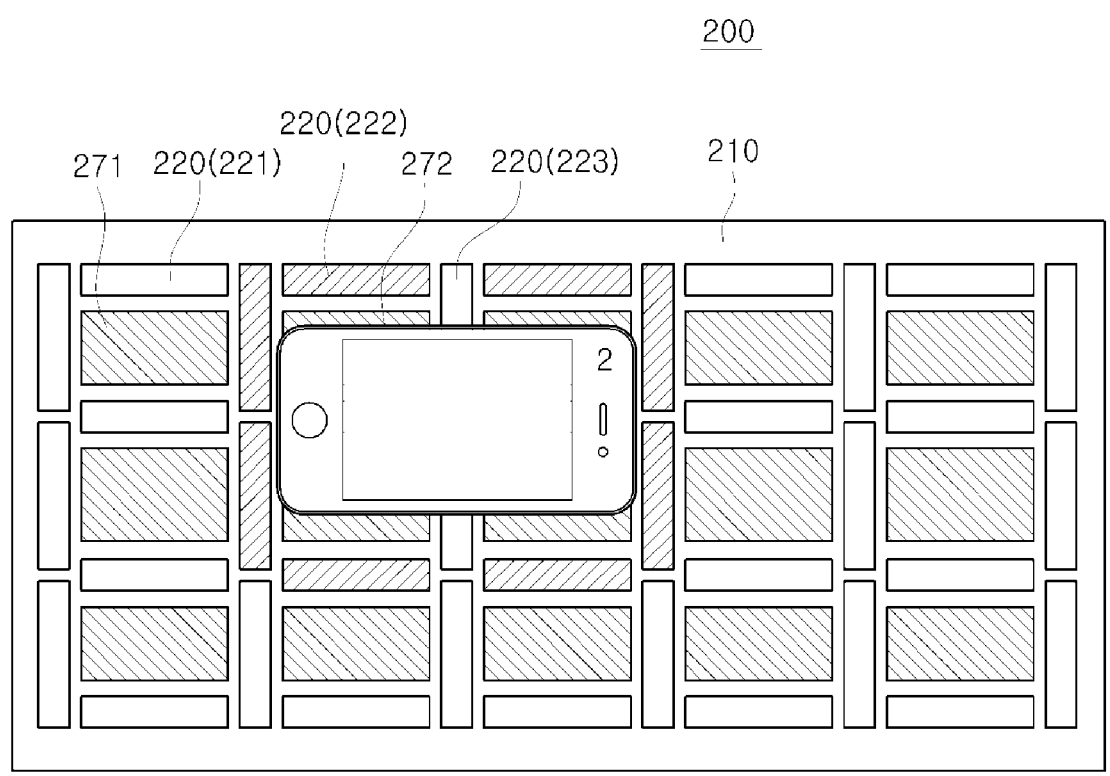
FIG. 16 is a plan view when a guard provided in a sideboard among boards in accordance with embodiments of the present disclosure protrudes.

FIG. 16 is a plan view when a guard provided in a sideboard in accordance with embodiments of the present disclosure protrudes.

As shown in FIG. 16, when the terminal 2 that is an external object is placed on the sideboard 200, the sideboard 200 forms a fence having a larger size than that of the terminal 2 in order to prevent the movement of the terminal 2. The fence may be formed by the plurality of guards. That is, the sideboard 200 forms the fence by protruding upward two or more guards 222 positioned closest to the outer periphery of the terminal 2 among guards 221 and 222 which are not brought into contact with the terminal 2.

In this instance, the guard 223 that is brought into contact with the terminal 2 is kept inserted, so the same height as that of the surface of the base 210 may be maintained. The two or more guards 222 which protrude may be selected by a user or automatically selected. This will be described below.

The function of an operation unit 272 whose exposure to the outside is blocked by the object 2 among the plurality of operation units 270 (271 and 272) arranged in the sideboard may be deactivated. For example, when the function of the operation unit whose exposure is blocked by the object is a horn, the sideboard deactivates the function of the horn.

In addition, the operation unit 272 whose exposure is blocked by the object 2 may have a function set in advance. For example, when it is assumed that functions of two operation units whose exposure is blocked by the object are a horn and door opening and the function set in advance is turning-on of an indoor lamp, the sideboard turns on the indoor lamp or the like when any one operation unit of the two operation units is operated in a state in which the object is placed on the sideboard.

In addition, when the plurality of operation units 272 whose exposure to the outside is blocked by the object 2 are provided, the sideboard may have only any one of the functions of the operation unit which are blocked. That is, when the terminal is pressed in a state in which the terminal is placed on the sideboard so the operation unit is operated, the sideboard may execute any one function. For example, it is assumed that functions of two operation units whose exposure is blocked by the object are a horn and door opening and any one function is the horn, the sideboard may sound the horn when any one of the two operation units is operated in a state in which the object is placed on the sideboard.

A structure of such a sideboard will be described with reference to FIGS. 17 to 19.

Figure 17:
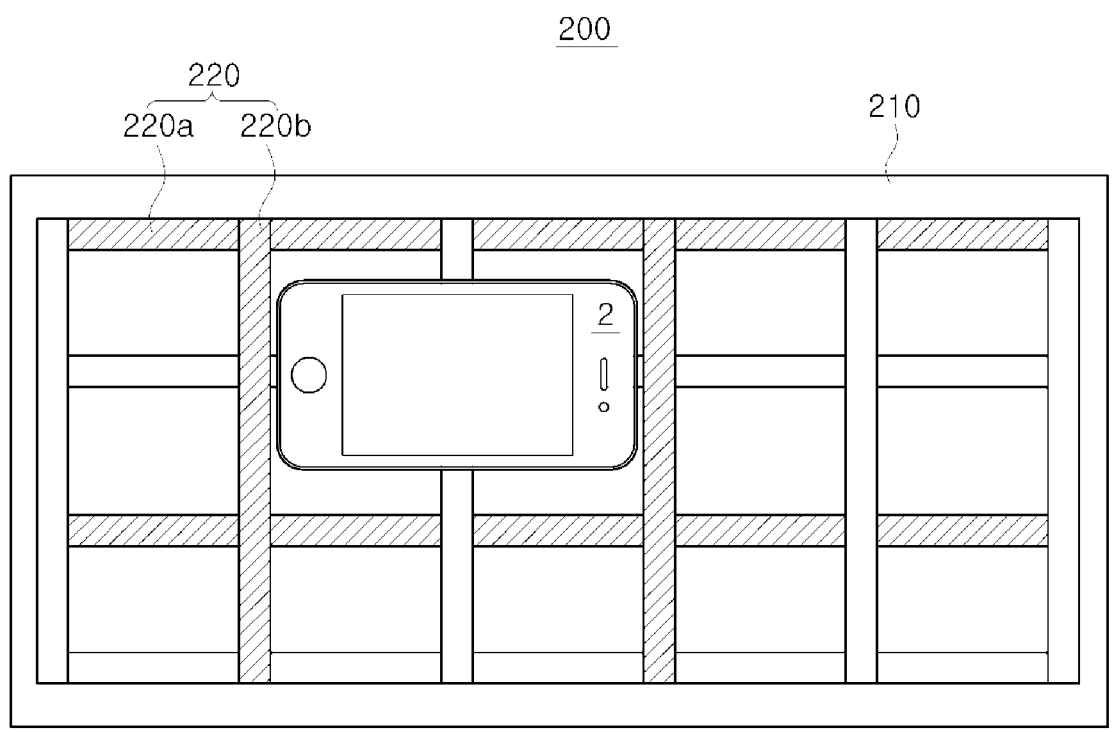
FIGS. 17 to 19 are examples of other shapes of a guard provided in a sideboard among boards in accordance with embodiments of the present disclosure.

As shown in FIG. 17, the sideboard 200 includes a horizontal guard 220a in which guards having horizontally the same position are integrally formed and a vertical guard 220b in which guards having vertically the same position are integrally formed.

The sideboard may form a fence having a larger size than that of the object by protruding guards of four azimuths which are positioned adjacent to the object. That is, the sideboard may form the fence by protruding only the four guards.

Figure 18:
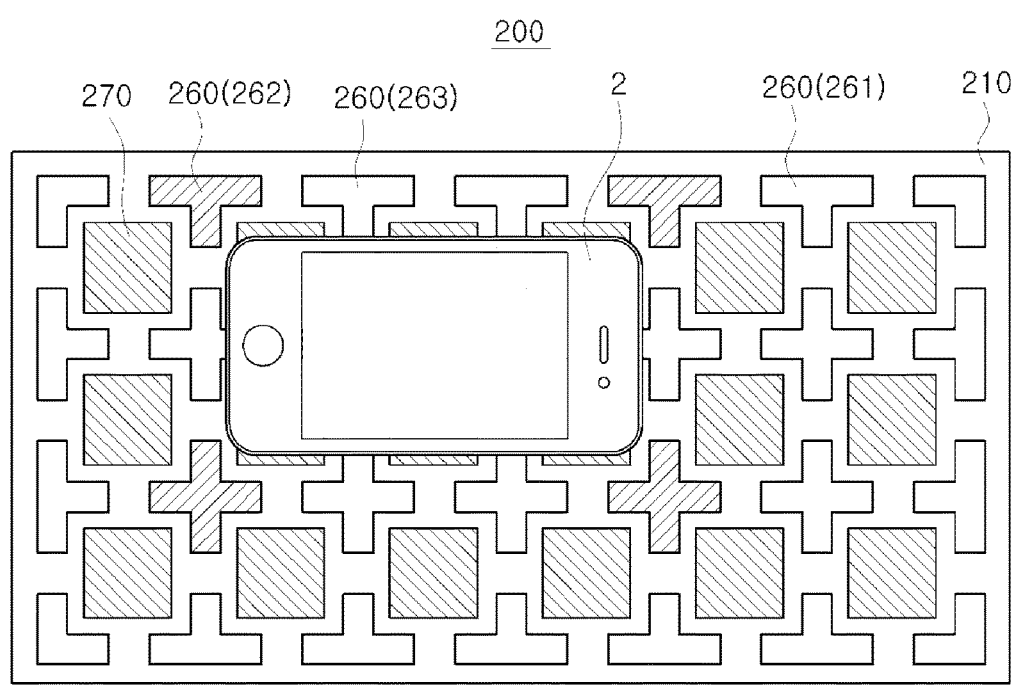

As shown in FIG. 18, the plurality of guards 260 provided in the sideboard 200 may be formed into a T-shape, an L-shape, and a plus (+)-shape while being formed in edge areas of the operation units adjacent to each other. That is, the outer guard may be formed into the T-shape and the L-shape, and the inner guard may be formed into the plus (+)-shape.

Such a sideboard 200 may determine the guard 262 corresponding to edges of six operation units in which the object is positioned among the plurality of guards 261, 262, and 263, and protrude the determined guard 262, and thereby may form a fence while minimizing the protrusion of the guard.

Figure 19:
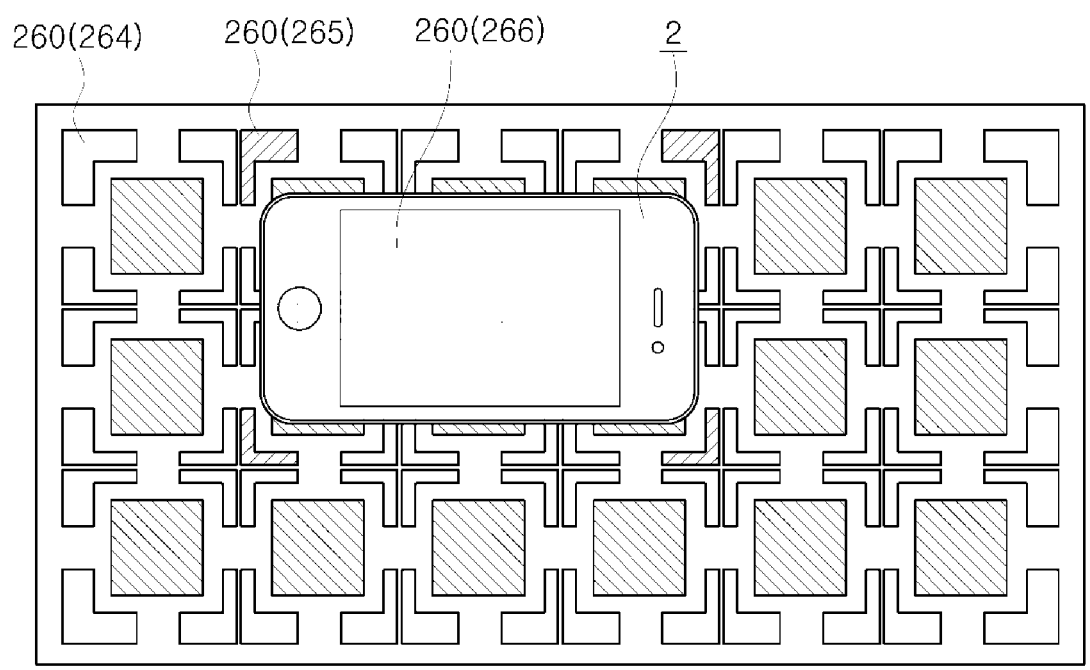

As shown in FIG. 19, the plurality of guards 260 provided in the sideboard 200 may be formed into the L-shape to conform to the shape of the edge of the operation unit.

Such a sideboard 200 may determine the guard 265 corresponding to edges of six operation units in which the object is positioned among the plurality of guards 264, 265, and 266, and protrude the determined guard 265, and thereby may form a fence while minimizing the protrusion of the guard.

A structure of the guard which protrudes upward when it is manually selected by a user or automatically selected will be described with reference to FIGS. 20 to 27.

Figure 20:
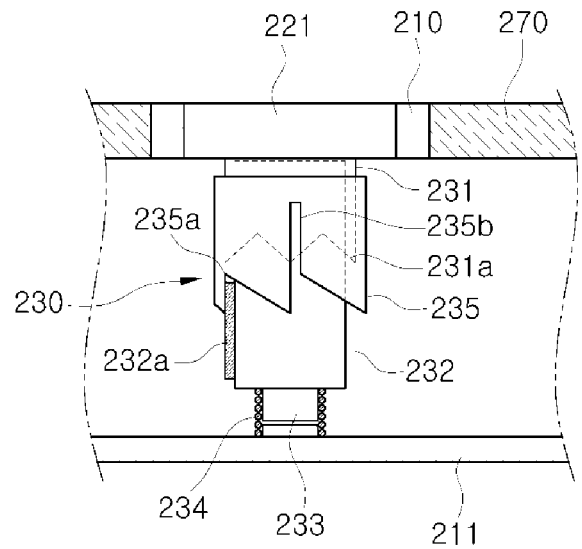
FIG. 20 is a schematic view of a manual guard provided in a board in accordance with embodiments of the present disclosure.
Figure 20:
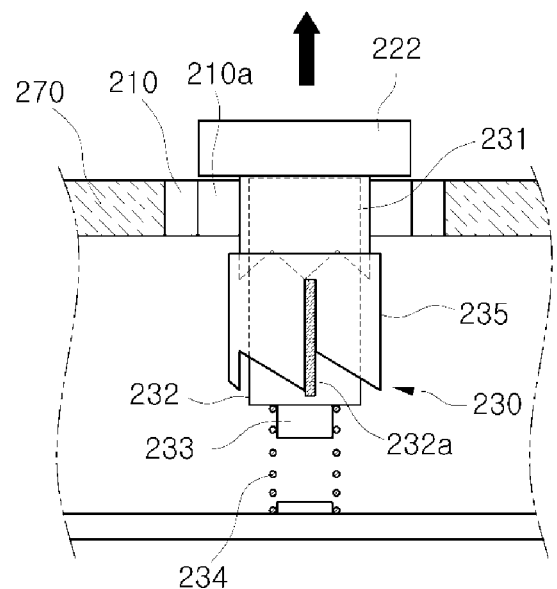

FIG. 20 is a schematic view of a manual guard provided in a board in accordance with embodiments of the present disclosure.

The sideboard 200 includes a base 210, a plurality of operation units 270 which are arranged in the base 210 and respectively have a predetermined function and a guard unit 220 that is arranged at an outer periphery of the plurality of operation units 270 and has a plurality of guards 221 and 222, and further includes a movement unit 230 that is provided in each of the plurality of guards of the guard unit and vertically moves each of the plurality of guards when a user's force acts on the guards.

The movement unit that is provided in each of the plurality of guards is formed to have the same structure. Among these movement units, one movement unit 230 will be described.

The movement unit 230 includes a first inclined member 231 that is connected to the guard and has a plurality of inclined portions 231a formed into a saw-tooth shape, a rotating member 232 that is removably coupled to the first inclined member 231 and has a latch portion 232a rotatably moved by contact of the inclined portion of the first inclined member 231 with the latch portion 232a, a support member 233 that is installed in an installation frame 221 to support the rotating member 232, an elastic member 234 that is arranged outside the support member 233 and is compressed or stretched by the rotating member 232, and a second inclined member 235 that has a plurality of mounting portions 235a and 235b having mutually different heights on which the latch portion 232a of the rotating member having been guided by the first inclined member 231 is mounted.

The movement structure of the movement unit 230 is the same as that in FIG. 7, and therefore description thereof will be omitted.

Figure 21:
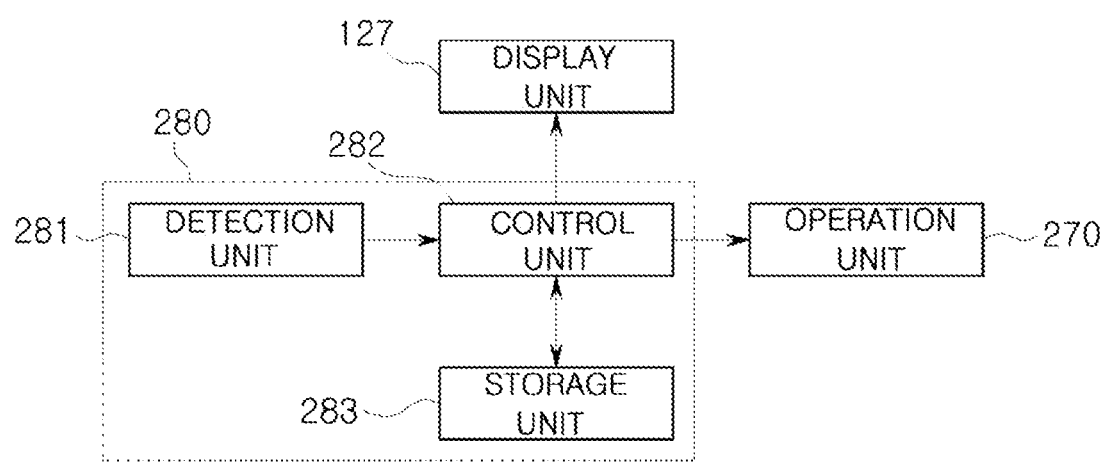
FIG. 21 is a control block diagram of a board in accordance with embodiments of the present disclosure.

FIG. 21 is a control block diagram of a sideboard in accordance with embodiments of the present disclosure, and the sideboard has a manual guard.

A driving module 280 for controlling the sideboard 200 includes a detection unit 281, a control unit 282, and a storage unit 283.

The detection unit 281 is respectively provided below the plurality of operation units, and outputs a signal when an object is placed on the sideboard. Such a detection unit 281 may include at least one of a pressure sensor such as a load cell, a pressure sensor such as a piezo sensor, an ultrasonic sensor, an optical sensor, and a proximity sensor such as a capacitive sensor.

The control unit 282 determines a position on which the object is placed based on the signal transmitted from the detection unit 281, and controls to deactivate the operation unit 270 positioned in the determined position or to execute a predetermined function.

More specifically, the control unit 282 controls, when a signal of any one operation unit is received, a function corresponding to the received signal of the operation unit to be performed, holds, when signals of two or more operation units are simultaneously received, the received signals of the operation units, when determining whether an object is detected, determines, when it is determined that the object is detected, whether the weight of the detected object is a reference weight or more, and controls, when it is determined that the weight of the object is the reference weight or more, the functions of the plurality of operation units to be deactivated.

When the weight of the object is the reference weight or more although the signals of the two or more operation units are not received, the control unit 282 may control the functions of the plurality of operation units to be deactivated.

When it is determined that the weight of the detected object is less than the reference weight and the object is placed on the two or more operation units, the control unit 282 may control the protrusion of the guard, and when any one operation unit of the two or more operation units is pressed, the control unit 282 may control to perform only any one function of the functions of the two operation units. In this regard, any one function of the functions of the two operation units may be selected based on priorities of the functions of the plurality of operation units, or selected by a user.

Figure 22:
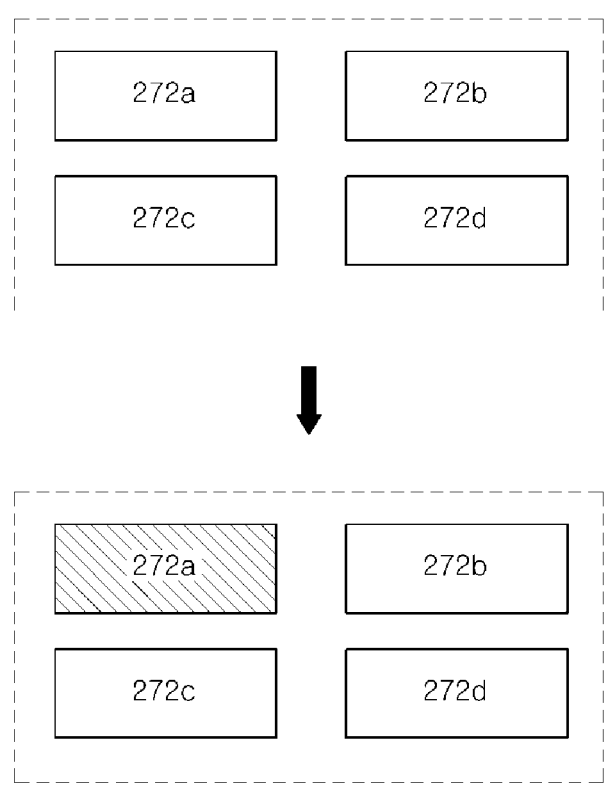
FIG. 22 is an example of a case in which an operation unit provided in a board in accordance with embodiments of the present disclosure is activated.

Referring to FIG. 22, when an object is placed on four operation units 272a, 272b, 272c, an 272d, the sideboard may activate only one operation unit 272a among four operation units 272a, 272b, 272c, 272d and deactivate the remaining operation units 272b, 272c, and 272d.

In addition, when it is determined that the weight of the detected object is less than the reference weight and the object is placed on two or more operation units, the control unit 282 may control the protrusion of the guard, and when any one operation unit among the two or more operation units is pressed, the control unit 282 may control to perform a predetermined function.

When the object is placed on the two or more operation units, the control unit 282 may control information of the operation unit whose exposure is blocked by the object to be displayed on the display unit 127.

When the object is placed on the two or more operation units, the control unit 282 may control change information of the function of the operation unit to be displayed on the display unit 127.

Through this, a user may readily recognize information about the operation unit whose function is deactivated or changed.

Figure 23:
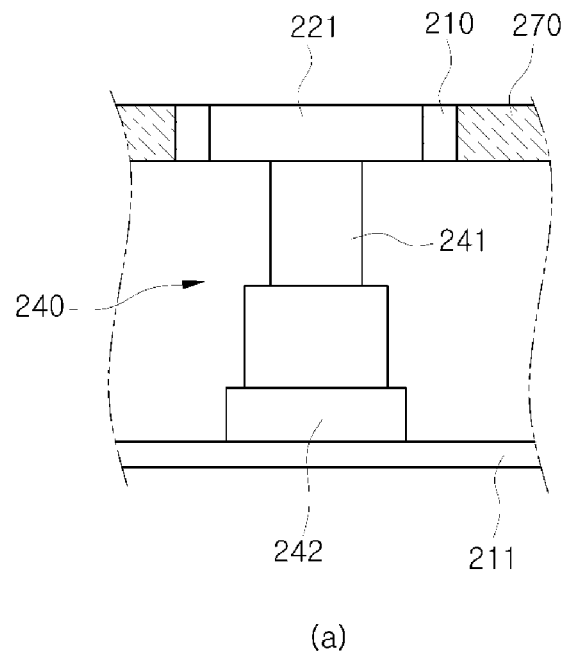
FIG. 23 is an example of an automatic guard and a movement unit provided in a board in accordance with embodiments of the present disclosure.
Figure 23:
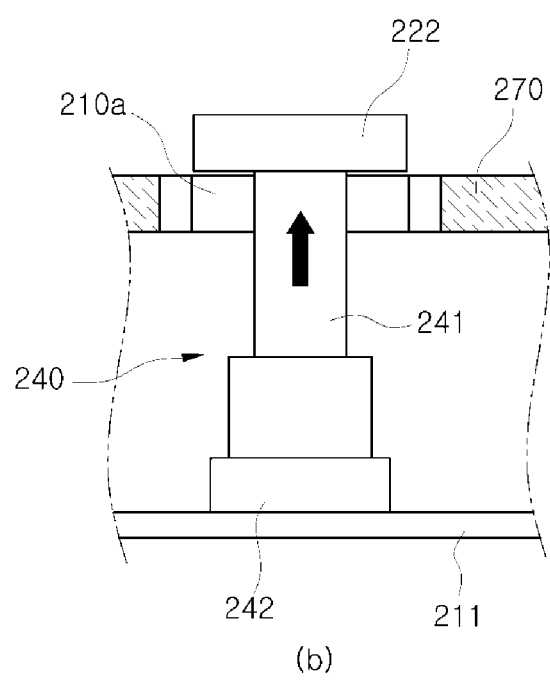

FIG. 23 is a schematic view of an automatic guard provided in the sideboard 200 in accordance with embodiments of the present disclosure.

The sideboard 200 includes a base 210, a plurality of operation units 270 which are arranged in the base 210 and respectively have a predetermined function and a guard unit 220 that is arranged at an outer periphery of the plurality of operation units 270 and has a plurality of guards 221 and 222, and further includes a movement unit 240 that is provided in each of the plurality of guards of the guard unit and automatically moves each of the plurality of guards when an object is detected.

The movement unit 240 that is provided in each of the plurality of guards is formed to have the same structure. Among these movement units, one movement unit 240 will be described. The movement unit 240 includes a rod member 241 that is integrally fixed to the guard 221 and vertically moves by pressure, and an actuator 242 that controls the rod member 241 to be moved by applying a moving force to the rod member 241.

The actuator 242 may further include a cylinder (not shown) that is provided below the rod member 241 and applies pressure to the rod member 241, a compressor (not shown) that generates pressure and applies the generated pressure to the cylinder, and a valve (not shown) that is disposed between the compressor (not shown) and the cylinder and adjusts the transmission of the pressure generated from the compressor (not shown).

The movement unit 240 may further include an elastic member (not shown) that is provided below the rod member 241 while being provided inside the cylinder and applies a restoring force to the rod member 241.

When air pressure in the cylinder is removed, the rod member 241 returns to its original position. In this instance, the guard 221 is positioned inside the hole 210a of the base.

When the air pressure is applied into the cylinder, the rod member 241 pushes the guard 222. In this instance, the guard 222 is moved toward the upper side of the base 210 through the hole 210a, so it protrudes from the base 210.

In addition, the automatic guard may be vertically moved by a movement unit implemented in the manner of an electromagnet.

Figure 24:
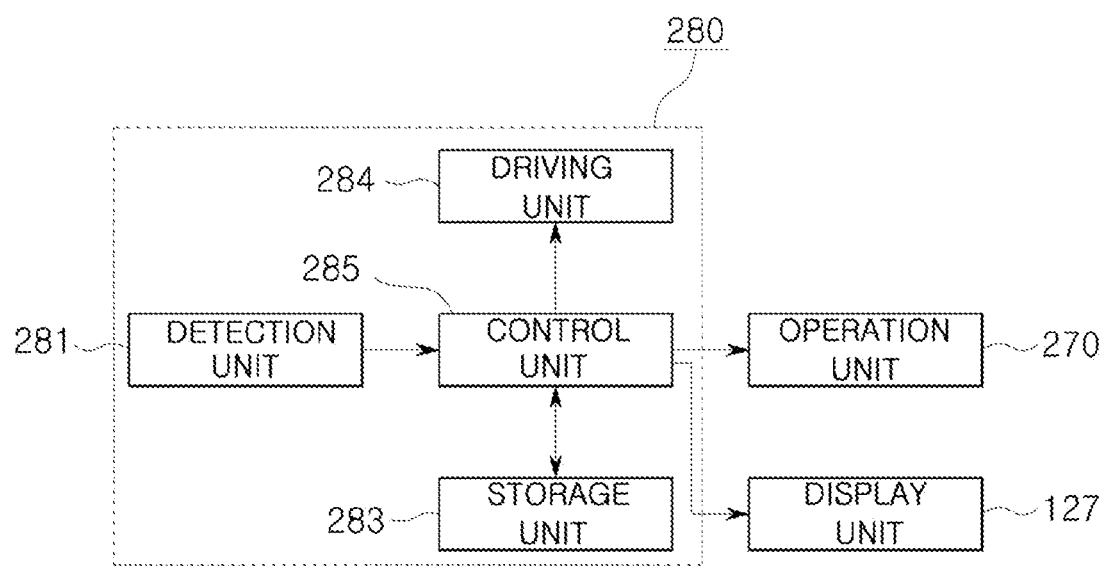
FIG. 24 is a control block diagram of a board in accordance with embodiments of the present disclosure.

FIG. 24 is a control block diagram of the sideboard in accordance with embodiments of the present disclosure, and a driving module 280 includes a detection unit 281, a control unit 285, a storage unit 283, and a driving unit 284.

The detection unit 281 is respectively provided below the plurality of operation units, and outputs a signal when an object is placed on the sideboard.

Such a detection unit 281 may include at least one of a pressure sensor such as a load cell, a pressure sensor such as a piezo sensor, an ultrasonic sensor, an optical sensor, and a proximity sensor such as a capacitive sensor.

The control unit 285 determines a position on which the object is placed based on the signal transmitted from the detection unit 281, and controls the guard to protrude by the movement of the movement unit 240 by controlling driving of the driving unit 284 when the position of the object is detected for a predetermined time or more. That is, the control unit 285 determines the guard closest to at least four azimuths while determining the guard closest to the object based on the position of the object, and controls the protrusion of the determined guard.

In addition, the control unit 285 controls to deactivate the operation unit 270 positioned in the determined position or to execute a predetermined function. More specifically, the control unit 285 controls, when a signal of any one operation unit is received, a function corresponding to the received signal of the operation unit to be performed, holds, when signals of two or more operation units are simultaneously received, the received signals of the operation units, when determining whether an object is detected, determines, when it is determined that the object is detected, whether the weight of the detected object is a reference weight or more, and controls, when it is determined that the weight of the object is the reference weight or more, the functions of the plurality of operation units to be deactivated.

When the weight of the object is the reference weight or more although the signals of the two or more operation units are not received, the control unit 285 may control the functions of the plurality of operation units to be deactivated.

When it is determined that the weight of the detected object is less than the reference weight and the object is placed on the two or more operation units, the control unit 285 may control the protrusion of the guard, and when any one operation unit of the two or more operation units is pressed, the control unit 285 may control to perform only any one function of the functions of the two operation units. Any one function of the functions of the two operation units may be selected based on priorities of the functions of the plurality of operation units, or selected by a user.

In addition, when it is determined that the weight of the detected object is less than the reference weight and the object is placed on two or more operation units, the control unit 285 may control the protrusion of the guard, and when any one operation unit among the two or more operation units is pressed, the control unit 285 may control to perform a predetermined function.

When the object is placed on the two or more operation units, the control unit 285 may control information of the operation unit whose exposure is blocked by the object to be displayed on the display unit 127.

When the object is placed on the two or more operation units, the control unit 285 may control change information of the function of the operation unit to be displayed on the display unit 127. Through this, a user may readily recognize information about the operation unit whose function is deactivated or changed.

When it is determined that the object is removed based on the signal transmitted from the detection unit 281, the control unit 285 controls the movement unit 240 so that the protruding guard is lowered and re-activates the function of the operation unit which has been deactivated.

The storage unit 283 stores position information of the plurality of operation units and position information of the plurality of guards.

The driving unit 284 transmits a driving signal to the movement unit 240 so that the determined guard is vertically moved. That is, the driving unit 284 may be a circuit that drives the compressor and the valve of the movement unit.

In addition, a case of a dashboard among boards will be briefly described.

A dashboard 123 may include a base having an inclination, a plurality of operation units which are arranged in the base, and a plurality of guards which are arranged at outer peripheries of the plurality of operation units, and further include a movement unit for vertically moving the plurality of guards. The dashboard 123 determines a position at which an object is placed based on a signal transmitted from the detection unit, and controls the guard to protrude by movement of the movement unit by controlling the driving of the driving unit when the position of the object corresponds to positions of two or more operations units.

Figure 25:
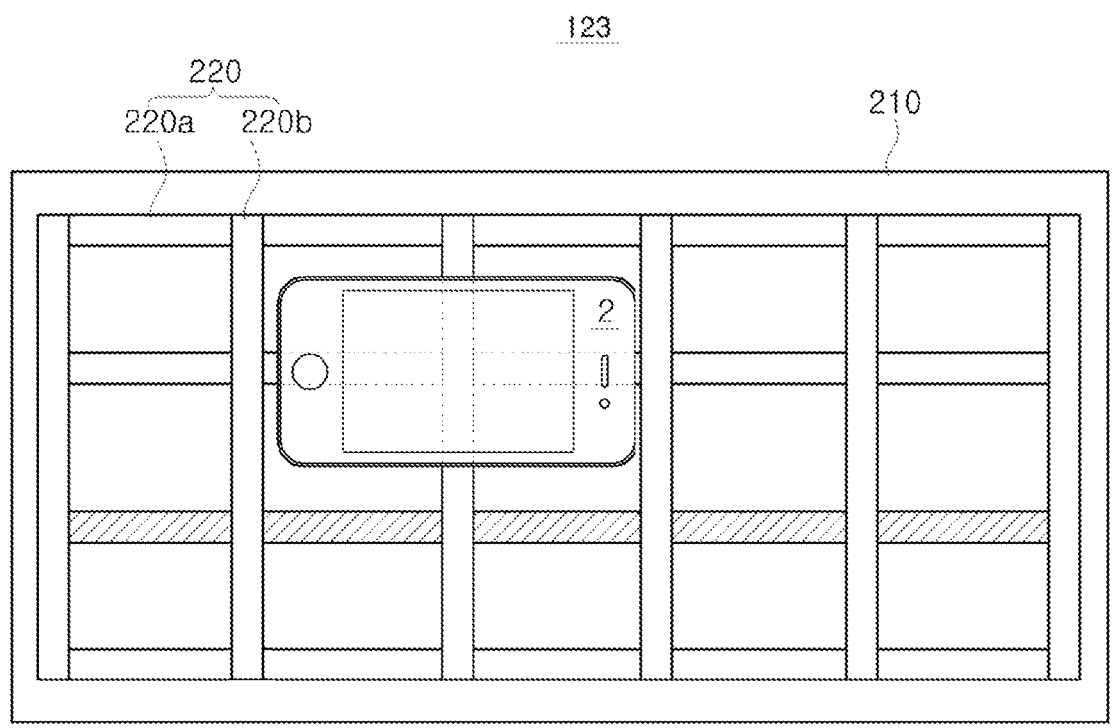
FIG. 25 is an example of a case in which a guard provided in a dashboard in accordance with embodiments of the present disclosure protrudes.

As shown in FIG. 25, the dashboard 123 may determine the guard closest to the object based on the position of the object, determine the guard positioned in a downward direction among the determined guards, and then controls only the guards in the downward direction to protrude.

Thus, it is possible to prevent an object placed on the inclined dashboard from falling down by the protruding guard.

In addition, the dashboard 123 may allow a protrusion length of the guard in the downward direction to be increased while protruding all of the guards of four azimuths.

In addition, the guard of the dashboard may manually or automatically protrude to the outside in the same manner as in the guard of the sideboard. The structure of such a guard of the dashboard may be the same as that of the guard of the sideboard, and thus description thereof will be omitted.

Another example in which the guard is automatically moved in a vertical direction will be described with reference to FIGS. 26a and 26b and FIGS. 27 and 28.

Figure 26A:
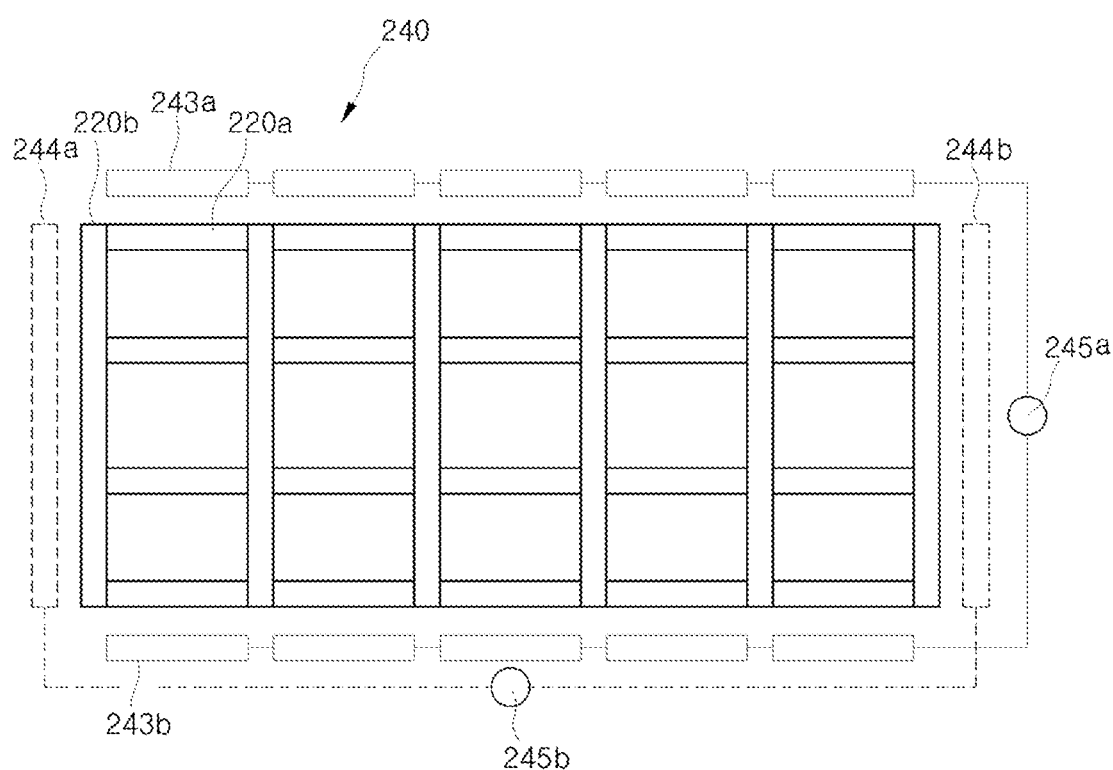
FIGS. 26A and 26B and FIGS. 27 and 28 are other examples of an automatic guard and a movement unit provided in a board in accordance with embodiments of the present disclosure.

As shown in FIG. 26A, the sideboard 200 includes a horizontal guard 220a in which guards having horizontally the same position are integrally formed and a vertical guard 220b in which guards having vertically the same position are integrally formed.

The sideboard 200 includes a pair of first movement units 243a and 243b for moving the horizontal guard 220a, a pair of second movement units 244a and 244b for moving the vertical guard 220b, a first actuator 245a for controlling positions and vertical movement of the first movement units 243a and 243b, and a second actuator 245b for controlling positions and vertical movement of the second movement units 244a and 244b.

Figure 26B:
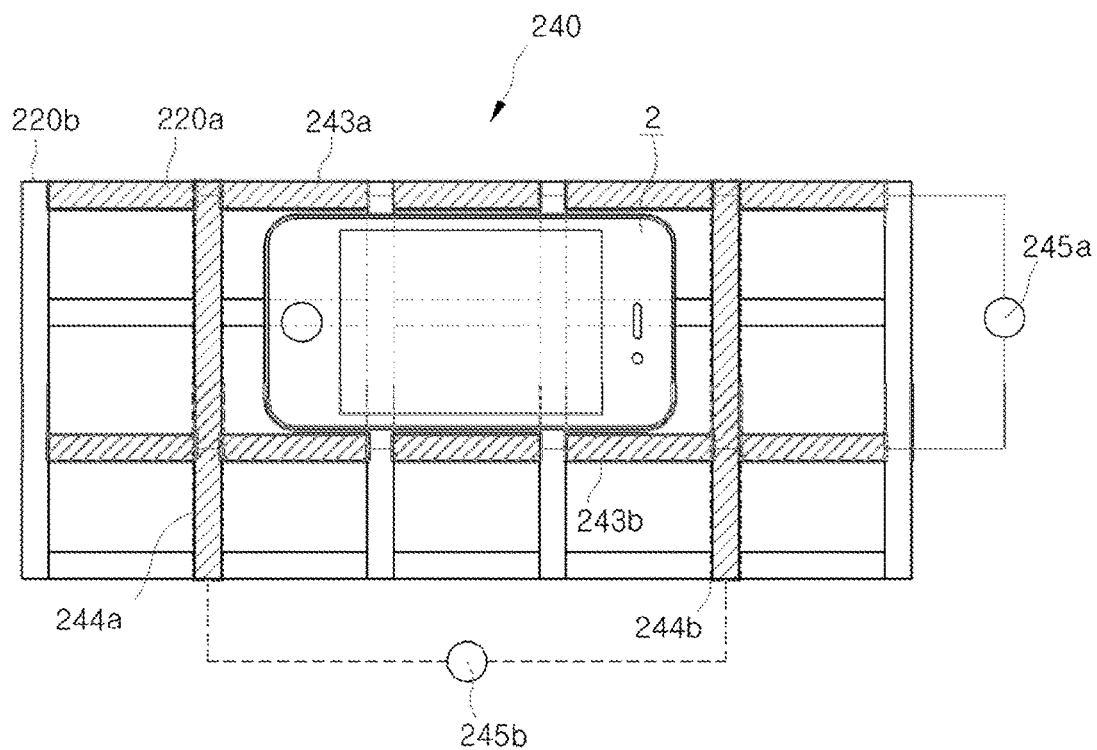

As shown in FIG. 26B, the sideboard 200 determines six operation units in which an object is positioned among a plurality of operation units 261, 262, and 263, determines guards of four azimuths positioned closest to the determined operation units, moves the first movement units 243a and 243b to the position of the determined horizontal guard by controlling the first actuator, moves the second movement units 244a and 244b to the position of the determined vertical guard by controlling the second actuator, and then moves the first movement units and the second movement units upward, so that the horizontal guard and the vertical guard protrude from the upper side of the base.

In this manner, the sideboard may protrude the guards of four azimuths positioned closest to the object, and thereby form a fence having a larger size than that of the object. That is, the sideboard may form the fence by protruding only the four guards.

Figure 27:
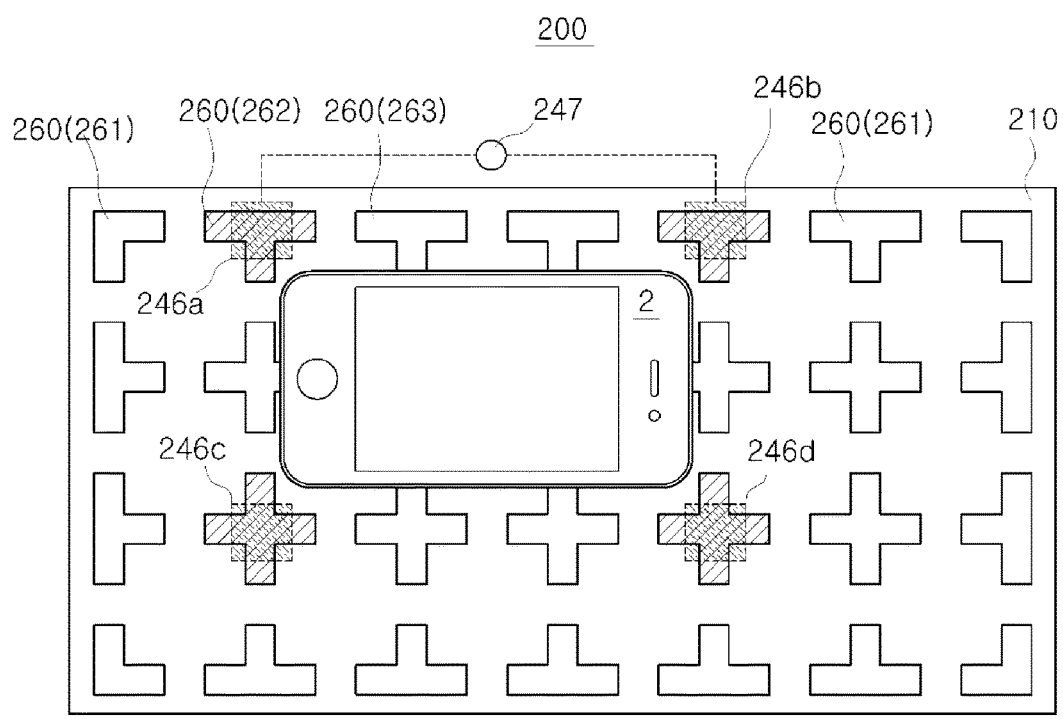

As shown in FIG. 27, the sideboard 200 may include a plurality of guards which are formed into a T-shape, an L-shape, and a plus (+)-shape while being formed in edge areas of the operation units adjacent to each other. That is, the outer guard may be formed into the T-shape and the L-shape, and the inner guard may be formed into the plus (+)-shape.

In addition, the sideboard 200 may further include four movement units 246a, 246b, 246c, and 246d which are positioned below the plurality of guards 260 (261, 262, and 263) and are movable in four horizontal directions, and an actuator 247 that controls horizontal movement and vertical movement of the four movement units.

Such a sideboard 200 determines the guard 262 corresponding to edges of six operation units in which the object is positioned among the plurality of guards 261, 262, and 263, horizontally moves the four movement units to the position of the determined guard 262, and then moves the movement units upward, so that the guard 262 may protrude from the upper side of the base. In this instance, it is possible to form a fence by the guard moved to the upper side of the base.

Figure 28:
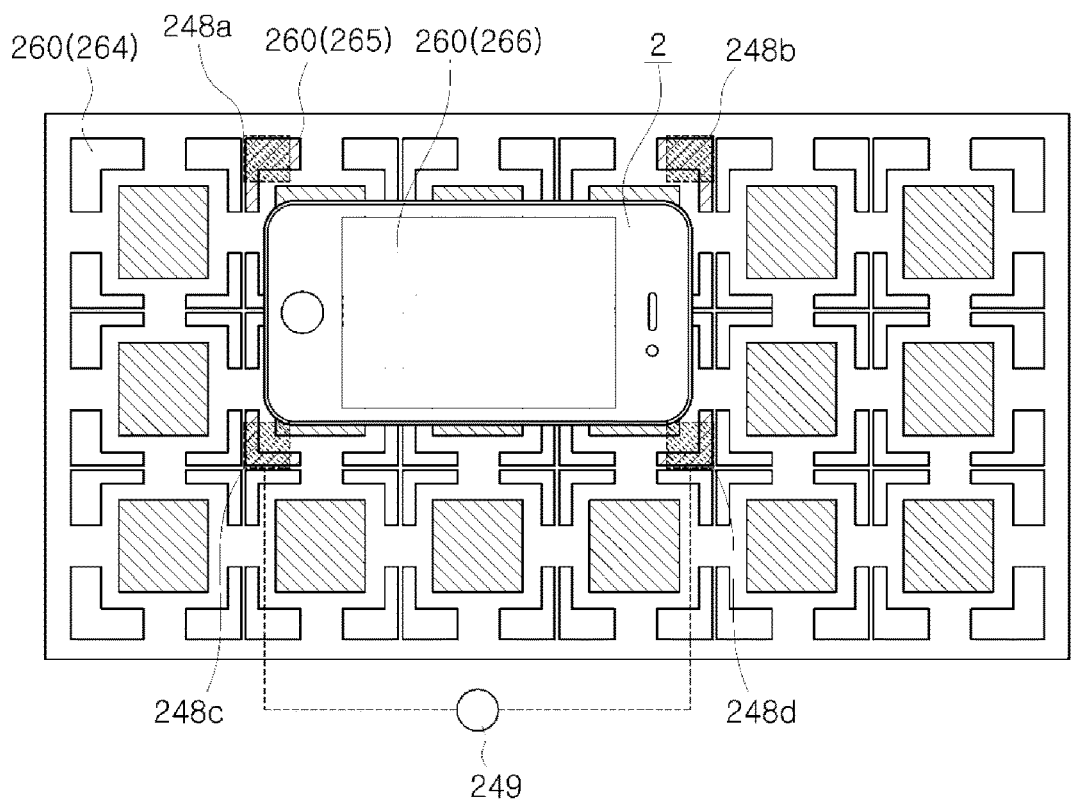

As shown in FIG. 28, the sideboard 200 includes a plurality of operation units 270 which are formed in the base, and a plurality of guards 260 which are formed in an L-shape while being formed in an edge area of each of the plurality of operation units.

In addition, the sideboard 200 may further include four movement units 248a, 248b, 248c, and 248d which are positioned below the plurality of guards and movable in four horizontal directions, and an actuator 249 that controls horizontal movement and vertical movement of the four movement units.

Such a sideboard 200 determines the guard 266 corresponding to edges of six operation units in which an object is positioned among the plurality of guards 264, 265, and 266, horizontally moves the four movement units 248a, 248b, 248c, and 248d to the position of the determined guard 266, and then moves the four movement units 248a, 248b, 248c, and 248d upward, so that the guard 266 may protrude from the upper side of the base. Through this, the sideboard may form a fence on the surface.

As is apparent from the above description, the board in accordance with embodiments of the present disclosure can be normally used as a general operation board, and prevent, when there is an object required to be stored, the operation unit from being unintentionally operated by changing or deactivating the function of the operation unit whose exposure to the outside is blocked by the object while being used as a board having a storage space. In addition, the board in accordance with embodiments of the present disclosure can notify a user of information about the operation unit whose exposure to the outside is blocked by the object, and therefore a user can readily recognize the operation unit whose function is changed or deactivated. In addition, the board in accordance with embodiments of the present disclosure can be normally used as a general board, and used as a board having a storage space when there is an object required to be stored, and therefore, it is possible to improve user's convenience and prevent failure of the object.

Thus, according to the present disclosure, it is possible to solve a problem of a lack of the storage space by increasing the storage space, and increase the effect of arrangement. In addition, according to the present disclosure, it is possible to prevent the operation unit from being wrongly operated by the object, and thereby may prevent a malfunction of the corresponding device. As a result, it is possible to improve the marketability of the vehicle and improve the safety of the driver.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A board comprising:
a base;
a plurality of operation units that are provided in the base, perform predetermined functions, and generate signals when they are pressed;

a guard unit that is provided in the base and has a plurality of guards that are provided at outer peripheries of the plurality of operation units and formed to be vertically movable; and
a movement unit that vertically moves the plurality of guards,
wherein the movement unit includes:
a first inclined member that is provided in at least one guard of the plurality of guards,
a rotating member that is removably coupled to the first inclined member and has a latch portion,
an elastic member that is compressed or stretched by the rotating member,
a support member that is provided inside the elastic member and supports the rotating member, and
a second inclined member that has first and second mounting portions having different heights from each other on which the latch portion of the rotating member having been guided by the first inclined member is mounted.

2. The board according to claim 1, further comprising:
a detection unit that detects a position of an object; and
a control unit that controls operations of the movement unit based on the detected position of the object,
wherein the movement unit further includes:
a rod member that vertically moves the at least one guard, and
an actuator that applies a moving force to the rod member.

3. The board according to claim 2, wherein the control unit deactivates functions of at least one operation unit among the plurality of operation units based on the detected position of the object.

4. The board according to claim 2, wherein the control unit changes functions of at least one operation unit among the plurality of operation units based on the detected position of the object.

5. The board according to claim 2, wherein the control unit controls a protrusion of a guard of the plurality of guards positioned closest to the position of the object but not brought into contact with the object.

6. The board according to claim 5, wherein the control unit determines the guard positioned closest to the position of the object but not brought into contact with the object, and controls protrusion of a guard corresponding to an edge of the object among guards not brought into contact with the object.

7. The board according to claim 5, wherein the control unit determines a operation unit among the plurality of operation units which is shielded from the outside of the base based on the position of the object, and controls to perform only a function of any one of the plurality of operation units when multiple operation units are shielded from the outside of the base.

8. The board according to claim 7, wherein the control unit controls to hold signals of two or more operation units when signals of the two or more operation units are generated.

9. The board according to claim 7, wherein the control unit controls a height of the protruding guard to vary based on an inclination of the base and positions of the plurality of guards.

10. The board according to claim 5, wherein the control unit controls protrusion of the guard positioned closest to the position of the object when the object is detected by at least two operation units among the plurality of operation units.

11. A vehicle comprising:
a dashboard and a sideboard;
a plurality of operation units that are provided in at least one of the dashboard and the sideboard, perform predetermined functions, and generate signals when they are pressed;
a guard unit that has a plurality of guards which are provided at outer peripheries of the plurality of operation units and formed to be vertically movable; and
a movement unit that vertically moves the plurality of guards.

12. The vehicle according to claim 11, wherein the movement unit includes:
a first inclined member that is provided in at least one guard of the plurality of guards,
a rotating member that is removably coupled to the first inclined member and has a latch portion,
an elastic member that is compressed or stretched by the rotating member,
a support member that is provided inside the elastic member and supports the rotating member, and
a second inclined member that has first and second mounting portions having different heights from each other on which the latch portion of the rotating member having been guided by the first inclined member is mounted.

13. The vehicle according to claim 11, wherein the movement unit includes:
a rod member that vertically moves the at least one guard, and
an actuator that applies a moving force to the rod member.

14. The vehicle according to claim 11, further comprising:
a detection unit that detects a position of an object; and
a control unit that controls operations of the movement unit based on the detected position of the object.

15. The vehicle according to claim 14, wherein the control unit deactivates functions of at least one operation unit among the plurality of operation units based on the detected position of the object.

16. The vehicle according to claim 14, wherein the control unit changes functions of at least one operation unit among the plurality of operation units based on the detected position of the object.

17. The vehicle according to claim 14, wherein the control unit controls a protrusion of a guard of the plurality of guards positioned closest to the position of the object but not brought into contact with the object.

18. The vehicle according to claim 17, wherein the control unit controls protrusion of the guard positioned closest to the position of the object when the object is detected by at least two operation units among the plurality of operation units.

19. The vehicle according to claim 17, wherein the control unit controls a height of the protruding guard to vary based on an inclination of the base and positions of the plurality of guards.

20. A board comprising:
a base in which a plurality of holes are formed into a lattice shape;
a guard unit that has a plurality of guards which are arranged so as to be vertically movable while being respectively arranged inside the plurality of holes;
a movement unit that vertically moves the plurality of guards;
a detection unit that detects a position of an object; and
a control unit that controls at least one guard among the plurality of guards to protrude by controlling the movement unit based on the detected position of the object.

21. The board according to claim 20, wherein the movement unit includes:
- a rod member that vertically moves the at least one guard, and
- an actuator that applies a moving force to the rod member.

22. A board comprising:
- a base in which a plurality of holes are formed into a lattice shape;
- a guard unit that has a plurality of guards which are respectively arranged inside the plurality of holes, wherein a guard on which force from a user acts protrudes to an outside of the base; and
- a movement unit that vertically moves the plurality of guards.

23. The board according to claim 22, wherein the movement unit includes:
- a first inclined member that is provided in the protruding guard,
- a rotating member that is brought into contact with and separated from the first inclined member and has a latch portion,
- an elastic member that is compressed or stretched by the rotating member,
- a support member that is provided inside the elastic member and supports the rotating member, and
- a second inclined member that has a plurality of mounting portions having mutually different heights on which the latch portion of the rotating member having been guided by the first inclined member is mounted.

* * * * *